United States Patent
Ozturk et al.

(10) Patent No.: US 10,861,261 B2
(45) Date of Patent: *Dec. 8, 2020

(54) APPARATUSES, SYSTEMS AND METHODS FOR ELECTRONIC DATA LOGGING

(71) Applicant: RM ACQUISITION, LLC, Skokie, IL (US)

(72) Inventors: Yusuf Ozturk, Wilmette, IL (US); Ravi Kodavarti, Chicago, IL (US); Maged Riad, Roselle, IL (US)

(73) Assignee: RM ACQUISITION, LLC, Chicago, IL (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/120,533

(22) Filed: Sep. 4, 2018

(65) Prior Publication Data

US 2018/0374284 A1    Dec. 27, 2018

Related U.S. Application Data

(63) Continuation of application No. 15/083,832, filed on Mar. 29, 2016, now Pat. No. 10,127,743.

(51) Int. Cl.
*G07C 5/08* (2006.01)
*G06Q 10/06* (2012.01)
*G07C 5/00* (2006.01)
*G07C 5/02* (2006.01)

(52) U.S. Cl.
CPC ..... *G07C 5/085* (2013.01); *G06Q 10/063114* (2013.01); *G07C 5/008* (2013.01); *G07C 5/02* (2013.01); *G07C 5/0808* (2013.01); *G07C 5/0816* (2013.01); *G07C 5/0841* (2013.01)

(58) Field of Classification Search
CPC .......... G07C 5/085; G07C 5/008; G07C 5/02; G07C 5/0808; G07C 5/0816; G07C 5/0841; G06Q 10/063114

See application file for complete search history.

(56) References Cited

U.S. PATENT DOCUMENTS

| 6,317,668 | B1 | 11/2001 | Thibault |
| 6,526,341 | B1 | 2/2003 | Bird et al. |
| 6,622,083 | B1 | 9/2003 | Knockeart et al. |

(Continued)

FOREIGN PATENT DOCUMENTS

| CA | 2619126 A1 | 8/2008 |
| WO | WO-2007/022154 A2 | 2/2007 |

OTHER PUBLICATIONS

International Search Report and Written Opinion for Application No. PCT/US2017/012943, dated Mar. 10, 2017.

(Continued)

*Primary Examiner* — Dale W Hilgendorf

(74) *Attorney, Agent, or Firm* — Marshall, Gerstein & Borun LLP

(57) ABSTRACT

Apparatuses, systems, and methods are provided for electronic data logging. More particularly, apparatuses, systems, and methods are provide for electronic data logging which may incorporate a vehicle electronic device that may store data when the vehicle electronic device is not in communication with an external device and that may transmit data when the vehicle electronic device is in communication with an external device.

26 Claims, 18 Drawing Sheets

(56) References Cited

U.S. PATENT DOCUMENTS

| | | | |
|---|---|---|---|
| 6,718,425 B1* | 4/2004 | Pajakowski et al. | G07C 5/008 710/315 |
| 6,807,481 B1 | 10/2004 | Gastelum | |
| 7,117,075 B1 | 10/2006 | Larschan et al. | |
| 8,442,508 B2* | 5/2013 | Harter et al. | G07C 5/008 455/419 |
| 8,626,568 B2* | 1/2014 | Warkentin et al. | G07C 5/008 705/7.38 |
| 9,235,936 B2 | 1/2016 | Harter et al. | |
| 9,299,200 B2 | 3/2016 | Harter et al. | |
| 9,361,737 B2 | 6/2016 | Harter et al. | |
| 9,646,433 B1* | 5/2017 | Sanchez et al. | G07C 5/085 |
| 10,127,743 B2* | 11/2018 | Ozturk et al. | G07C 5/085 |
| 2002/0035421 A1 | 3/2002 | Warkentin | |
| 2010/0088163 A1* | 4/2010 | Davidson et al. | G07C 5/008 701/33 |
| 2013/0006715 A1 | 1/2013 | Warkentin et al. | |
| 2013/0226397 A1 | 8/2013 | Kuphal et al. | |
| 2014/0046570 A1 | 2/2014 | Mohn et al. | |
| 2015/0112542 A1 | 4/2015 | Fuglewicz | |
| 2015/0170428 A1 | 6/2015 | Harter et al. | |
| 2015/0170433 A1 | 6/2015 | Harter et al. | |
| 2015/0170434 A1 | 6/2015 | Harter et al. | |
| 2015/0193885 A1* | 7/2015 | Akiva et al. | G07C 5/008 705/4 |

OTHER PUBLICATIONS

International Preliminary Report on Patentability for Application No. PCT/US2017/012943, dated Oct. 2, 2018.

Office Action for European Application No. 17702978.2, dated Mar. 23, 2020.

* cited by examiner

APPARATUSES, SYSTEMS AND METHODS FOR ELECTRONIC DATA LOGGING

CROSS REFERENCE TO RELATED APPLICATION

The present application is a continuation of U.S. patent application Ser. No. 15/083,832, entitled APPARATUSES, SYSTEMS AND METHODS FOR ELECTRONIC DATA LOGGING, filed Mar. 29, 2016, the disclosure of which is incorporated herein in its entirety by reference.

TECHNICAL FIELD

The present disclosure generally relates to apparatuses, systems, and methods for electronic data logging. More particularly, the present disclosure relates to apparatuses, systems, and methods for electronic data logging which incorporate a vehicle electronic device that stores data when the vehicle electronic device is not in communication with an external device and that transmits data when the vehicle electronic device is in communication with an external device.

BACKGROUND

Electronic data logging systems are employed in a number of different applications, including logging operating data in process plants, logging weather related data, logging vehicle operation data, etc. Known electronic data logging systems typically acquire electronic data from one of more sensors. The electronic data logging systems may store the electronic data for later analysis.

Various Federal, State and local agencies (e.g., Department of Transportation, Transportation Safety Administration, etc.) have developed, and/or are developing, laws and rules that require electronic on-board recorder (EOBR) devices to be incorporated into commercial motor vehicles (CMVs). In accordance with certain laws and rules, an EOBR may, for example, record data for generating hours of service (HOS) reports, driver vehicle inspection reports (DVIRs), international fuel tax agreement (IFTA) reports, etc.

Because the new laws and rules require CMV operators to provide certain data, loss of data is a concern. Known systems do not incorporate mechanisms to prevent loss of data.

SUMMARY

A vehicle electronic device may include a processor and a memory. The vehicle electronic device may also include a vehicle data acquisition module, stored on the memory, that, when executed by the processor, causes the processor to receive vehicle data. The vehicle data may include vehicle odometer information and vehicle global positioning system information. The vehicle electronic device may further include a time data acquisition module, stored on the memory, that, when executed by the processor, causes the processor to receive time data. The time data may include information related to a time of day. The vehicle electronic device may further include a time-stamped vehicle data generation module, stored on the memory, that, when executed by the processor, causes the processor to generate time-stamped vehicle data. The time-stamped vehicle data may include the vehicle data correlated with the time data. The vehicle electronic device may yet further include a personal data acquisition module, stored on the memory, that, when executed by the processor, causes the processor to receive personal data. The personal data may include information associated with at least one vehicle operator. The vehicle electronic device may even further include a correlated vehicle data generation module, stored on the memory, that, when executed by the processor, causes the processor to generate correlated vehicle data. The correlated vehicle data may be representative of an association between the time-stamped vehicle data and the personal data. The vehicle electronic device may also include a personal electronic device availability determination module, stored on the memory, that, when executed by the processor, causes the processor to determine whether the vehicle electronic device is communicatively coupled with a personal electronic device. When the processor determines that the vehicle electronic device is communicatively coupled with a personal electronic device, the processor may transmit the correlated vehicle data to the personal electronic device. When the processor determines that the vehicle electronic device is not communicatively coupled with a personal electronic device, the processor may store the correlated vehicle data on the memory of the vehicle electronic device.

In another embodiment, a non-transitory, computer-readable, medium may include a vehicle data acquisition module that, when executed by a processor, causes the processor to receive vehicle data at a vehicle electronic device. The vehicle data may include vehicle odometer information and vehicle global positioning system information. The non-transitory, computer-readable, medium may also include a time data acquisition module that, when executed by a processor, causes the processor to receive time data. The time data may include information related to a time of day. The non-transitory, computer-readable, medium may further include a time-stamped vehicle data generation module that, when executed by a processor, causes the processor to generate time-stamped vehicle data. The time-stamped vehicle data may include the vehicle data correlated with the time data. The non-transitory, computer-readable, medium may yet further include a personal data acquisition module that, when executed by a processor, causes the processor to receive personal data. The personal data may include information associated with at least one vehicle operator. The non-transitory, computer-readable, medium may even further include a personal electronic device availability determination module that, when executed by the processor, causes the processor to determine whether the vehicle electronic device is communicatively coupled with a personal electronic device. When the processor determines that the vehicle electronic device is communicatively coupled with a personal electronic device, the processor may transmit the correlated vehicle data to the personal electronic device. When the processor determines that the vehicle electronic device is not communicatively coupled with a personal electronic device, the processor may store the correlated vehicle data on a memory of the vehicle electronic device.

In a further embodiment, an electronic data logging system may include a personal electronic device having a first processor and a first memory. The personal electronic device may also include a personal data acquisition module, stored on the first memory, that, when executed by the first processor, causes the first processor to receive personal data. The personal data may include information associated with at least one vehicle operator. The personal electronic device may further include a personal data transmission module, stored on the first memory, that, when executed by the first processor, causes the first processor to transmit the personal data to a vehicle electronic device. The vehicle electronic device may include a second processor and a second memory. The vehicle electronic device may also include a personal data receiving module, stored on the second memory, that, when executed by the second processor, causes the second processor to receive the personal data from the first processor. The vehicle electronic device may further include a vehicle data acquisition module, stored on the second memory, that, when executed by the second processor, causes the second processor to receive vehicle data in response to receiving the personal data. The vehicle data may include at least one of: vehicle position data, vehicle engine revolution per minute data, vehicle speed data, vehicle odometer data, or vehicle engine operating hour data. The vehicle electronic device may yet further include a time data acquisition module, stored on the second memory, that, when executed by the second processor, causes the second processor to receive time data. The time data may include information related to a time of day. The vehicle electronic device may yet further include a time-stamped vehicle data generation module, stored on the second memory, that, when executed by the second processor, causes the second processor to generate time-stamped vehicle data. The time-stamped vehicle data includes the vehicle data correlated with the time data. The vehicle electronic device may even further include a personal electronic device availability determination module, stored on the second memory, that, when executed by the second processor, causes the second processor to determine whether the vehicle electronic device is communicatively coupled with the personal electronic device. When the second processor determines that the vehicle electronic device is communicatively coupled with the personal electronic device, the second processor may transmit the time-stamped vehicle data to the personal electronic device. When the second processor determines that the vehicle electronic device is not communicatively coupled with the personal electronic device, the second processor may store the time-stamped vehicle data on the second memory.

DETAILED DESCRIPTION

Figure 1:
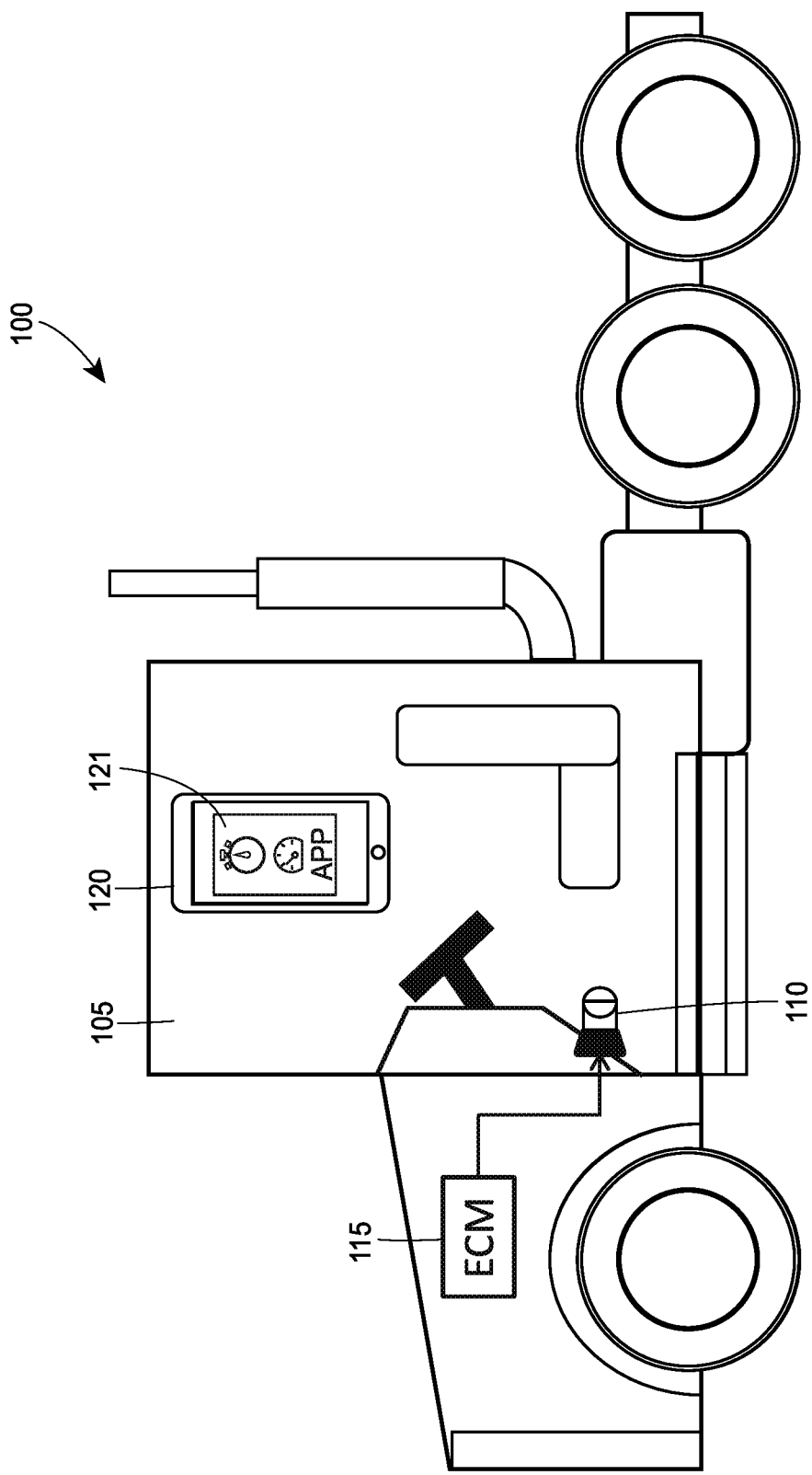
FIG. 1 depicts an example electronic data logging system incorporated into a vehicle.

Apparatuses, systems, and methods are provided for electronic data logging. As described in detail herein, associated electronic data may be acquired from a plurality of sensors (e.g., vehicle sensors), sources (e.g., a vehicle electronic control module), and user inputs. The electronic data may be correlated with associated time-of-day data and/or associated vehicle operator data. The electronic data may include, for example, any one of, all of, or any sub-combination of engine control unit history data, air supply pressure data, fuel consumption data, trip information data, vehicle speed data, vehicle cruise control status data, engine cooling fan drive status data, wheel speed data, vehicle service indication data, transmission control unit history data, body control unit history data, driver door status indicator data, passenger door indicator data, engine oil level data, engine oil pressure data, engine idle operation data, turbocharger status data, air start pressure data, steering wheel angle data, vehicle accelerometer data, vehicle pitch data, vehicle yaw data, vehicle distance data, idle shutdown data, engine hours data, engine revolutions data, time of day data, date of year data, vehicle hours data, vehicle direction data, vehicle speed data, fuel consumption data, vehicle weight data, cruise control speed set data, engine temperature data, power takeoff information data, fuel economy data, vehicle position (longitude/latitude/elevation) data, tire condition data, ambient conditions data, inlet air condition data, exhaust condition data, vehicle electrical power condition data, transmission fluid level data, transmission fluid pressure data, brake information data, engine coolant level data, engine coolant pressure data, vehicle odometer reading data, vehicle identification number data, crankcase pressure data, barometric pressure data, vehicle interior temperature data, air inlet temperature data, road surface temperature data, particulate trap inlet pressure data, boost pressure data, intake manifold temperature data, air inlet pressure data, air filter differential pressure data, exhaust gas temperature data, coolant filter differential pressure data, instantaneous fuel economy data, average fuel economy data, fuel temperature data, turbo oil temperature data, total fuel used data, trip fuel data, injector metering rail pressure data, injection control pressure data, percent fan speed data, engine-percent torque demand data, actual engine-percent torque data, accelerator pedal position data, percent load at current speed data, brake pedal position data, clutch pedal position data, water in fuel sensor data, etc.

As further described in detail herein, electronic data and/or correlated electronic data may be stored in, and/or transmitted from, a vehicle electronic device (e.g., an electronic on-board recorder (EOBR)) to a personal electronic device (e.g., a smartphone, a lap top computer, a tablet computer, a special purpose electronic device, etc.) and/or a remote electronic device (e.g., a remote server). As yet further described in detail herein, various reports (e.g., an hours of service (HOS) report, a driver vehicle inspection report (DVIR), an international fuel tax agreement (IFTA) report, etc.) and/or displays (e.g., an hours of service (HOS) display, a driver vehicle inspection report (DVIR) display, an international fuel tax agreement (IFTA) display, a vehicle gauges display, etc.) may be generated based on associated electronic data and/or correlated electronic data.

Turning to FIG. 1, an electronic data logging system 100 may include a vehicle 105 (e.g., a commercial motor vehicle) having an electronic control module (ECM) 115. The electronic data logging system 100 may further include a vehicle electronic device (e.g., an electronic on-board recorder (EOBR)) communicatively connected to the electronic control module (ECM) 115 (e.g., an engine control module, a body controller, etc.) via, for example, a vehicle bus (e.g., an OBDII protocol bus, a J1939 protocol bus, a J1708 protocol bus, etc.). The electronic data logging system 100 may also include a personal electronic device 120 having an electronic data logging application 121.

As described in detail herein, a user of the personal electronic device 120 may enter personal information (e.g., company data, vehicle operator data, vehicle identification number (VIN) data, etc.). As an alternative, vehicle identification number (VIN) data may be automatically acquired from an electronic control module 115 when, for example, the VIN data is available via the ECM 115. As further described in detail herein, personal data representative of the personal information may be transmitted from the personal electronic device 120 to the vehicle electronic device 110, thereby, the vehicle electronic device 110 may acquire vehicle data (e.g., vehicle location data, vehicle engine revolution per minute (RPM) data, vehicle speed data, vehicle odometer data, vehicle engine hour data, etc.) and time-of-day data, and may correlate the vehicle data with the personal data and the time-of-day data. As also described in detail herein, the vehicle electronic device 110 may store correlated vehicle data and/or may transmit the correlated vehicle data to the personal electronic device 120 and/or a remote electronic device (not shown in FIG. 1).

Figure 2:
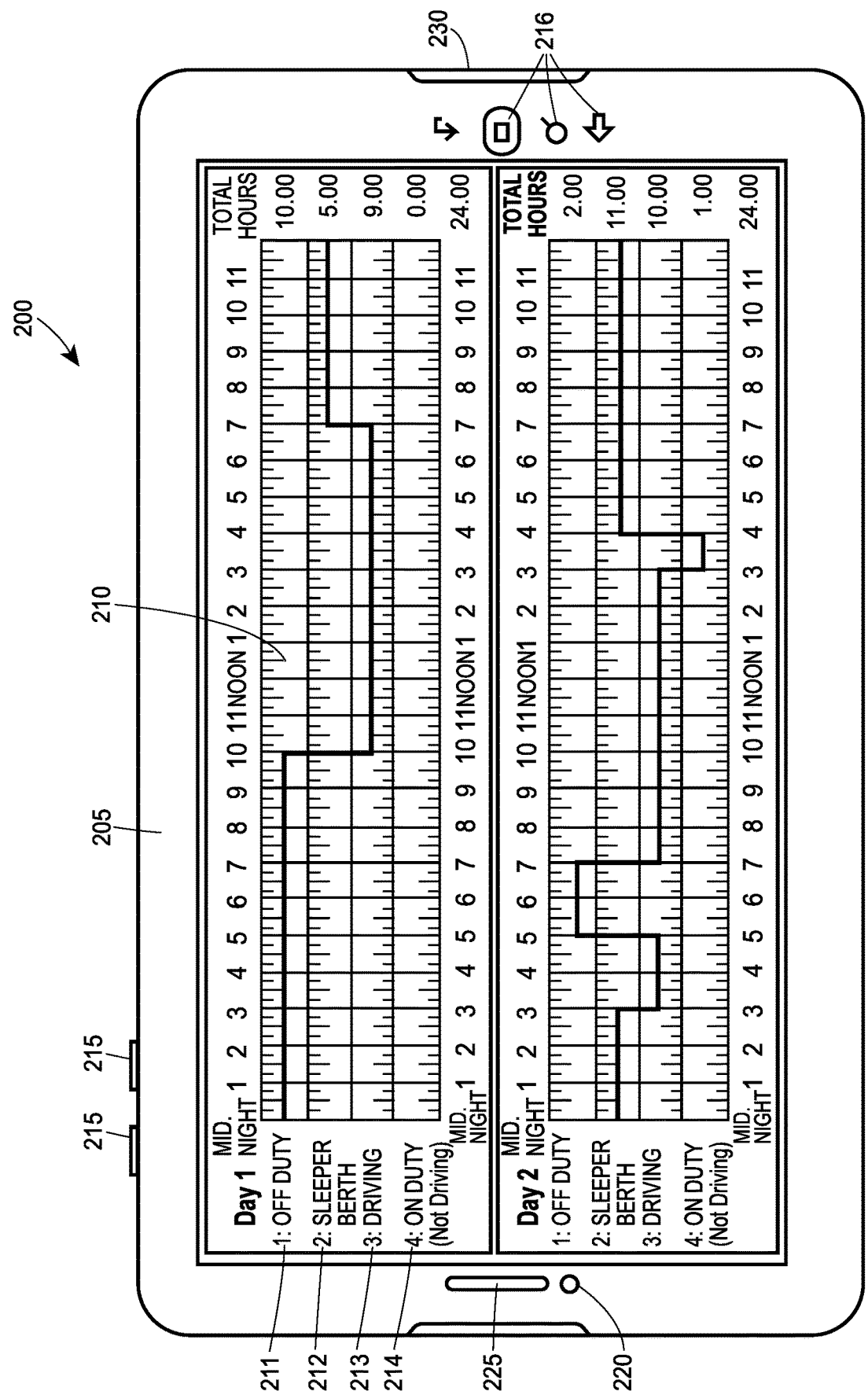
FIG. 2 depicts an example hours of service (HOS) report display.

With reference to FIG. 2, an electronic data logging system 200 may include a personal electronic device 205. The personal electronic device 205 may be similar to, for example, the personal electronic device 120 of FIG. 1. The personal electronic device 205 may include an hours of service (HOS) report display 210 that may indicate a number of hours a vehicle operator was off duty 211, a number of hours the vehicle operator was in a sleeper birth 212, a number of hours the vehicle operator was driving 213, and a number of hours the operator was on duty but not driving 214. As described in detail herein, the HOS report display may be generated based on, for example, correlated vehicle data received from a vehicle electronic device (e.g., vehicle electronic device 110 of FIG. 1). The personal electronic device 210 may further include audible volume controls 215, operator interface control inputs/indicators 216, a camera 220, a speaker 225, and a microphone 230. The display of the personal electronic device 210 may be, for example, any form of a known touch screen display or a non-touch screen display.

Figure 3:
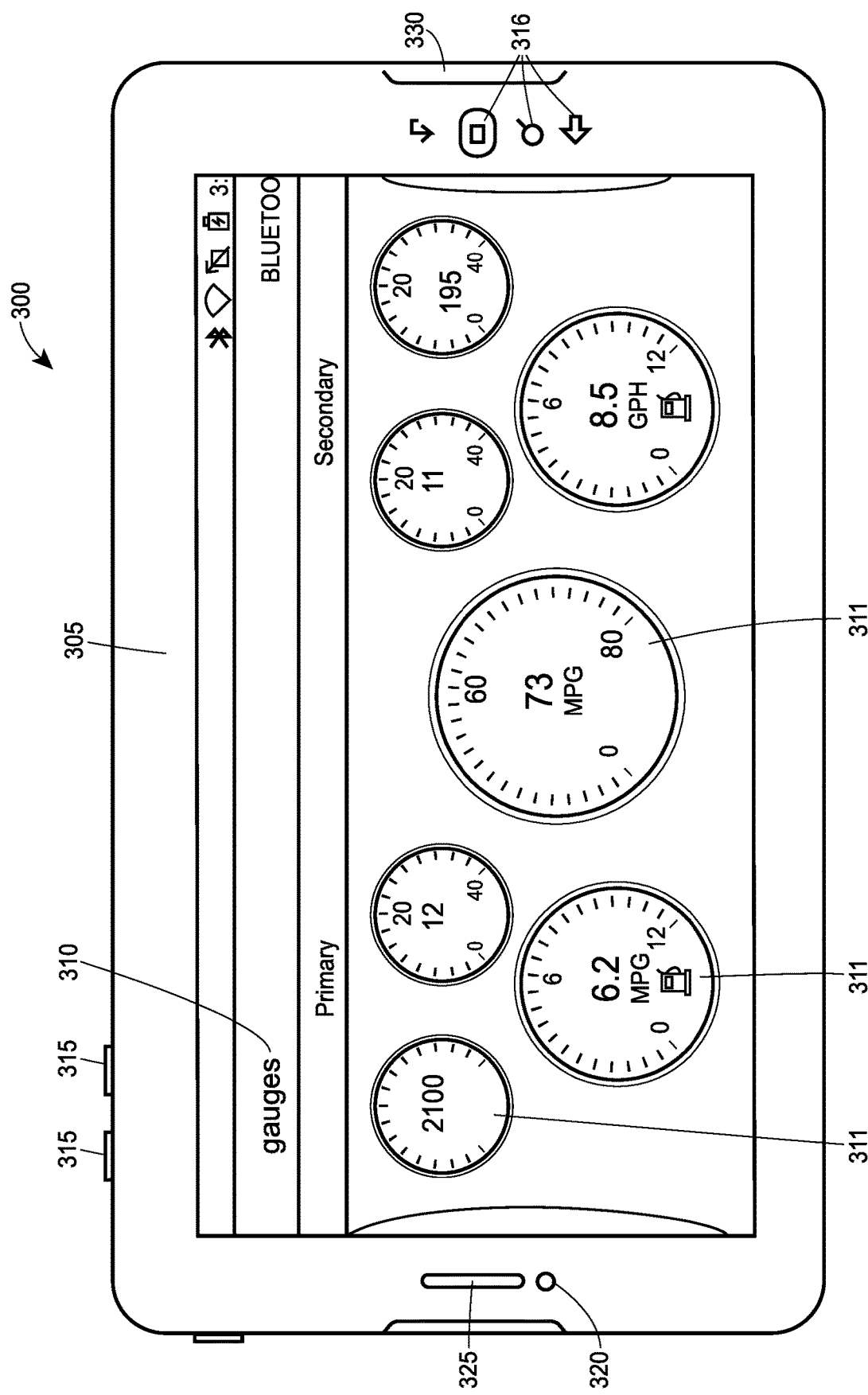
FIG. 3 depicts an example vehicle gauges display.

Turning to FIG. 3, an electronic data logging system 300 may include a personal electronic device 305. The personal electronic device 305 may be similar to, for example, the personal electronic device 120 of FIG. 1 or the personal electronic device 205 of FIG. 2. The personal electronic device 305 may include a vehicle gauges display 310 having a plurality of vehicle gauges 311. As described in detail herein, the vehicle gauges display 310 may be generated based on, for example, vehicle data received from a vehicle electronic device (e.g., vehicle electronic device 110 of FIG. 1). The personal electronic device 310 may further include audible volume controls 315, operator interface input controls/indicators 316, a camera 320, a speaker 325, and a microphone 330. The display of the personal electronic device 310 may be, for example, any form of a known touch screen display or a non-touch screen display.

Figure 4:
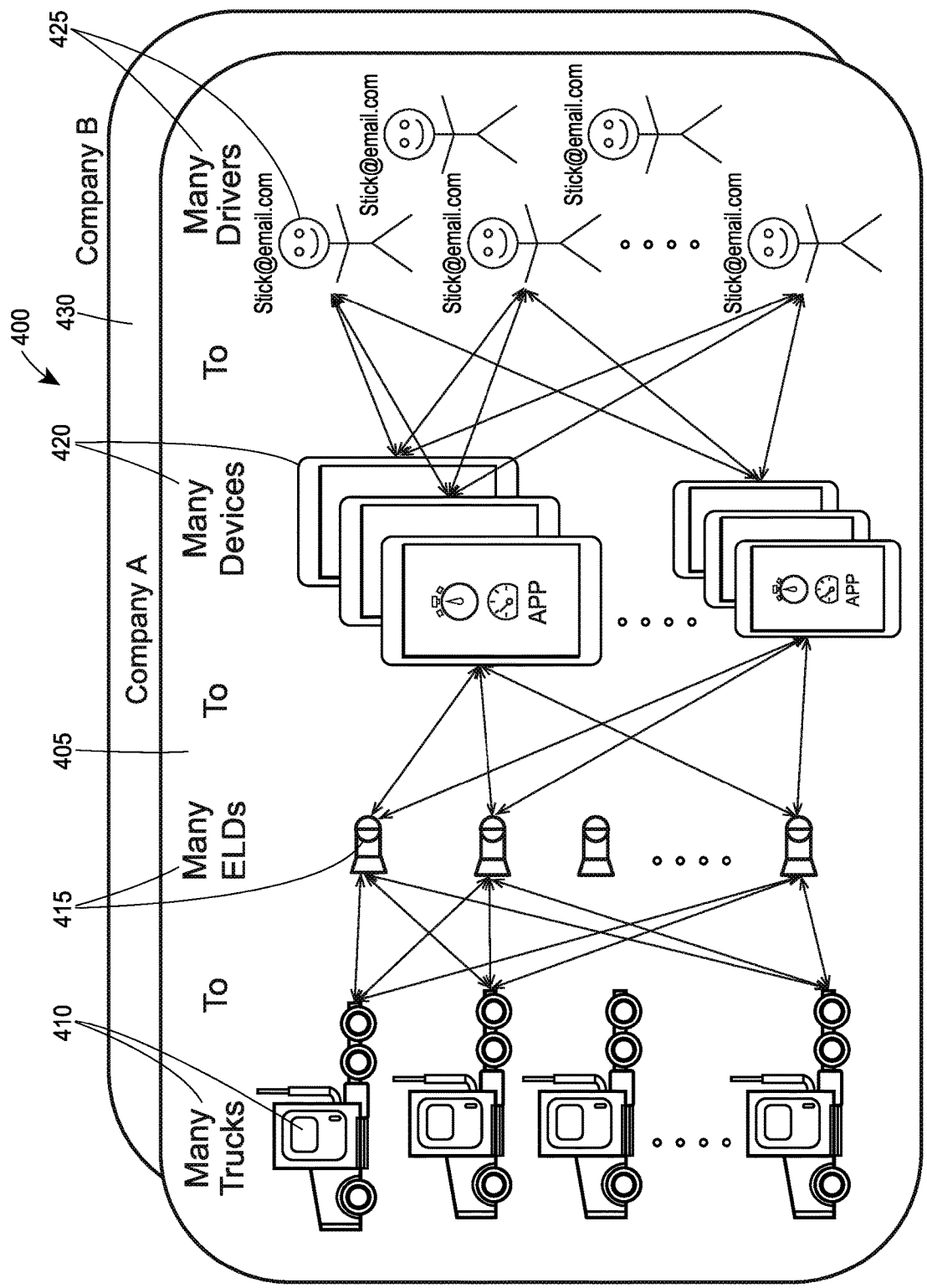
FIG. 4 depicts an example electronic data logging system including a plurality of vehicle companies, a plurality of vehicles, a plurality of vehicle electronic devices, a plurality of personal electronic devices, and a plurality of individual vehicle operators.

With reference to FIG. 4, an electronic data logging system 400 may include a plurality of companies 405, 430. Any one of, or all of the companies 405, 430 may include a plurality of vehicles 410. Any one of, or all of the vehicles 410 may be similar to, for example, the vehicle 105 of FIG. 1.

Any one of, or all of the vehicles 410 may include a vehicle electronic device 415 (e.g., an electronic logging device (ELD), an electronic on-board recorder (EOBR), etc.). Any one of, or all of the plurality of vehicle electronic devices 415 may be similar to, for example, the vehicle electronic device 110 of FIG. 1. As described in detail herein, a first vehicle electronic device of the plurality of vehicle electronic devices 415 may be correlated with a first individual of the plurality of individuals 425, installed in a first vehicle of the plurality of vehicles 410, and may acquire vehicle data from the first vehicle. As further described in detail herein, subsequent to the first vehicle electronic device being correlated with the first individual and acquiring vehicle data from the first vehicle, the first vehicle electronic device may be removed from the first vehicle and installed in a second vehicle of the plurality of vehicles 410. Subsequent to being installed in the second vehicle, the first vehicle electronic device may acquire vehicle data from the second vehicle and correlate the vehicle data from the second vehicle with the first individual. Alternatively, the first vehicle electronic device may be recorrelated with a second individual and any subsequent vehicle data, that is acquired by the first vehicle electronic device, may be correlated with the second individual rather than the first individual.

As further illustrated in FIG. 4, any one of, or all of the companies 405, 430 may include a plurality of personal electronic devices 420. As described in detail herein, any one of the plurality of personal electronic devices 420 may be associated with any one of the individuals 425. Alternatively, a plurality of personal electronic devices 420 may be associated with any one of the individuals 425. The personal electronic devices 420 may be similar to, for example, any one of the personal electronic devices 120, 205, 305 of FIGS. 1, 2 and 3, respectively.

Figure 5:
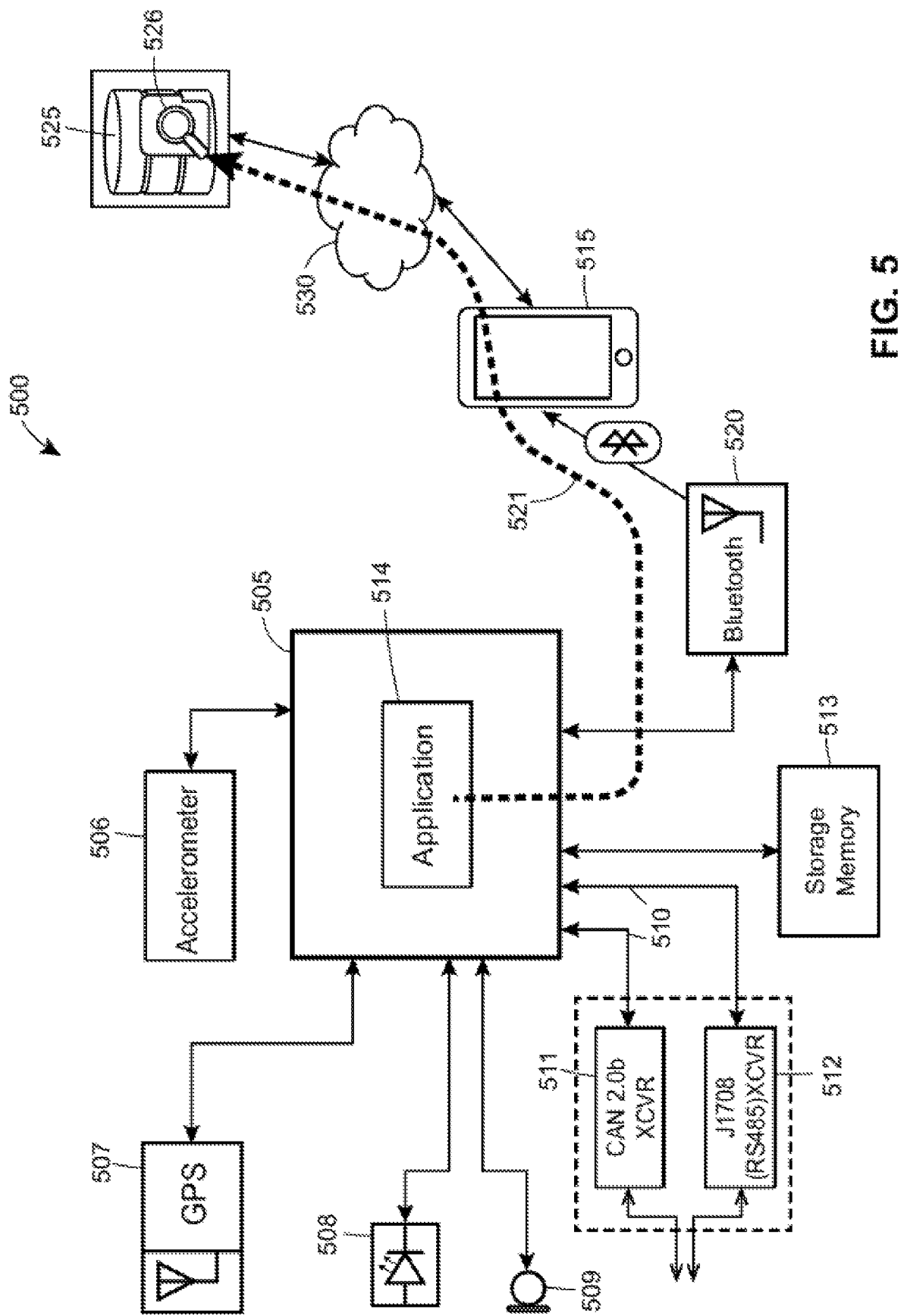
FIG. 5 depicts an example electronic data logging system including a vehicle electronic device, a personal electronic device, and a remote electronic device (e.g., a remote server)

Turning to FIG. 5, an electronic data logging system 500 may include a vehicle electronic device 505 (e.g., a microcontroller (MCU) having an electronic data logging application (or module) 514. The vehicle electronic device 505 may be similar to, for example, any one of the personal electronic devices 120, 205, 305, 420 of FIGS. 1-4, respectively. The vehicle electronic device 505 may include a vehicle bus connector 510 having, for example, a CAN 2.0b XCVR interface 511 and/or a J1708 (RS485) XCVR interface 512. The vehicle electronic device 505 may also include an audible output to an audible device (e.g., a speaker) 509, a visual output to a visual device 508 (e.g., an LED), a global positioning system (GPS) input from a GPS device 507, an accelerometer input from an accelerometer sensor 506, and a storage memory 513.

As described in detail herein, the vehicle electronic device 505 may acquire, for example, vehicle data, personal data and time-of-day data, and may correlate the vehicle data with the personal data and the time-of-day data. The vehicle electronic device 505 may transmit the correlated vehicle data 521 to a personal electronic device 515 via a wireless communication interface 520 (e.g., a BLUETOOTH® interface, WI-FI® interface, etc.). Alternatively, or additionally, the vehicle electronic device 505 may store the correlated vehicle data in the storage memory 513 when, for example, the personal electronic device 515 is not communicatively coupled to the vehicle electronic device 505. In lieu of, or in addition to, correlated vehicle data, the vehicle electronic device 505 may transmit and/or store vehicle data that is correlated with only the vehicle information and/or time-of-day (i.e., the vehicle data is not correlated with personal data).

As further described in detail herein, the personal electronic device 515 may store the correlated vehicle data within a memory of the personal electronic device 515 and/or may transmit the correlated vehicle data 521 via, for example, a cellular network connection 530 to a remote electronic device 525 (e.g., a remote server, a remote computing device, etc.). The remote electronic device 525 may store the correlated vehicle data in a memory 526. As described in detail herein, the personal electronic device 515 and the remote electronic device 525 may periodically reconcile correlated vehicle data stored in the personal electronic device 515 with correlated vehicle data stored in the memory 526 to, for example, insure that both versions include all available correlated vehicle data.

Figure 6:
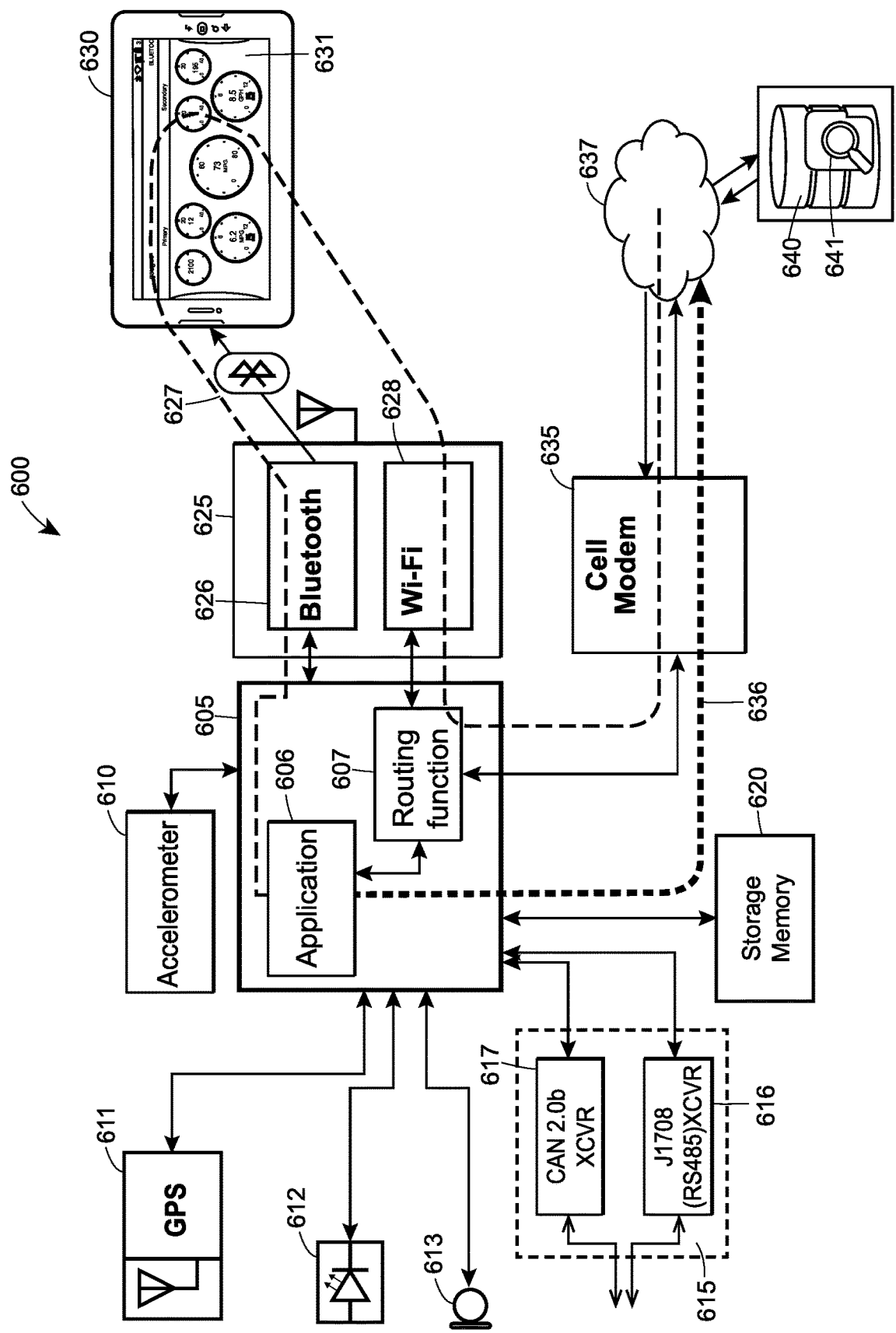
FIG. 6 depicts an example electronic data logging system including a vehicle electronic device having external communications peripherals, a personal electronic device, and a remote electronic device.

With reference to FIG. 6, an electronic data logging system 600 may include a vehicle electronic device 605 having an electronic data logging application (or electronic data logging module) 606 and a routing function (or routing module) 607. The vehicle electronic device 605 may be similar to, for example, any one of the personal electronic devices 120, 205, 305, 420, 505 of FIGS. 1-5, respectively. The vehicle electronic device 605 may include a vehicle bus connector 615 having, for example, a CAN 2.0b XCVR interface 617 and/or a J1708 (RS485) XCVR interface 616. The vehicle electronic device 605 may also include an audible output (e.g., a speaker) 613, a visual output 612, a global positioning system (GPS) input 611, an accelerometer input 610, a storage memory 620, a near field communication module 625, and a cellular communication module 635. The near field communication module 625 (e.g., a short range radio module) may include a first wireless communication interface 626 (e.g., a Bluetooth® interface) and a second wireless communication interface 628 (e.g., a WI-FI® interface).

As described in detail herein, the vehicle electronic device 605 may acquire, for example, vehicle data, personal data and time-of-day data, and may generate correlated vehicle data 627 based on the vehicle data with the personal data and the time-of-day data. The vehicle electronic device 605 may transmit the correlated vehicle data 627 to a personal electronic device 630 via a the first wireless communication interface 626. Alternatively, or additionally, the vehicle electronic device 605 may store the correlated vehicle data in the storage memory 620 when, for example, the personal electronic device 630 is not communicatively coupled to the vehicle electronic device 605. In lieu of, or in addition to, correlated vehicle data 627, the vehicle electronic device 605 may transmit and/or store vehicle data that is correlated with only the vehicle information and/or time-of-day (i.e., the vehicle data is not correlated with personal data).

As further described in detail herein, the personal electronic device 630 may store the correlated vehicle data within a memory 631 of the personal electronic device 630 and/or may transmit the reconciled vehicle data via, for example, the second wireless communication interface 628, the routing function 607, the cellular communication module 635, and the cellular communication network 637 to a remote electronic device 640 (e.g., a remote server, a remote computing device, etc.). The remote electronic device 640 may store the correlated vehicle data in, for example, a database table within memory 641. As described in detail herein, the personal electronic device 630 and the remote electronic device 640 may periodically reconcile correlated vehicle data stored in the memory 631 with correlated vehicle data stored in the memory 641 to, for example, insure that both versions include all available correlated vehicle data.

As further illustrated in FIG. 6, the vehicle electronic device 605 may transmit vehicle data and/or correlated vehicle data 636, via the cellular communication module 635 and a cloud based network, to the remote electronic device 640. As described in detail herein, the remote electronic device 640 may generate hours of service (HOS) data, an HOS report, a driver vehicle inspection report (DVIR), international fuel tax agreement (IFTA) data, or any combination thereof, based on the correlated vehicle data and/or vehicle data. As further described in detail herein, the remote electronic device 640 may transmit the correlated vehicle data and/or vehicle data to, for example, a vehicle manufacture.

Figure 7:
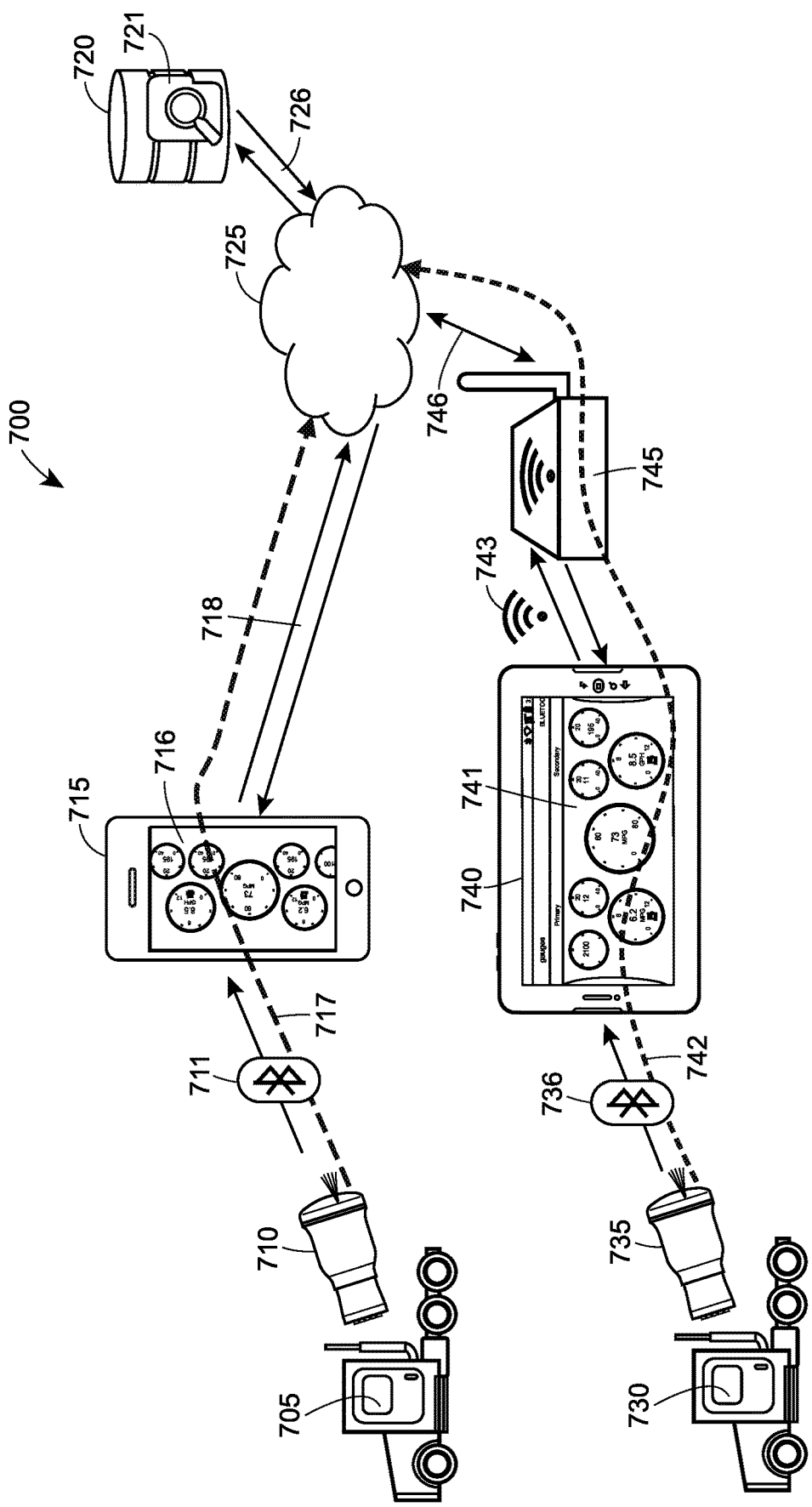
FIG. 7 depicts an example electronic data logging system including two vehicles, each vehicle having a respective vehicle electronic device in communication with a respective personal electronic device, and a remote electronic device.

Turning to FIG. 7, an electronic data logging system 700 may include a first vehicle 705 having a first vehicle electronic device 710 configured to transmit first correlated vehicle data 717 to a first personal electronic device 715 via a first communication link 711 (e.g., a BLUETOOTH® link, a WI-FI® link, a USB link, etc.). The first personal electronic device 715 may generate first hours of service (HOS) data, a first HOS report, a first driver vehicle inspection report (DVIR), first international fuel tax agreement (IFTA) data, a first gauges display 716, or any combination thereof, based on the first correlated vehicle data and/or first vehicle data. The first personal electronic device 715 may transmit the first vehicle data, the first correlated vehicle data, the first hours of service (HOS) data, the international fuel tax agreement (IFTA) data, or any combination thereof, to a remote electronic device 720 via a cloud based communication network 725 (e.g., an Internet network). The remote electronic device 720 may store the first vehicle data, the first correlated vehicle data, the first hours of service (HOS) data, the international fuel tax agreement (IFTA) data, or any combination thereof, on a memory 721. The first personal electronic device 715 and the remote electronic device 720 may periodically transmit first correlated vehicle data 718 and second correlated vehicle data 726 to, for example, reconcile the first correlated vehicle data 718 and the second correlated vehicle data 726.

The electronic data logging system 700 may also include a second vehicle 730 having a second vehicle electronic device 735 configured to transmit third correlated vehicle data 742 to a second personal electronic device 740 via a third communication link 736 (e.g., a BLUETOOTH® link, a WI-FI® link, a USB link, etc.). The second personal electronic device 740 may generate second hours of service (HOS) data, a second HOS report, a second driver vehicle inspection report (DVIR), second international fuel tax agreement (IFTA) data, a second gauges display 741, or any combination thereof, based on the third correlated vehicle data and/or second vehicle data. The second personal electronic device 740 may transmit the second vehicle data, the second correlated vehicle data, the second hours of service (HOS) data, the second international fuel tax agreement (IFTA) data, or any combination thereof, to the remote electronic device 720 via a wireless modem 745 and the cloud based communication network 725 (e.g., an Internet network). The remote electronic device 720 may store the second vehicle data, the third correlated vehicle data, the second hours of service (HOS) data, the second international fuel tax agreement (IFTA) data, or any combination thereof, on the memory 721. The second personal electronic device 740 and the remote electronic device 720 may periodically transmit third correlated vehicle data 743 and fourth correlated vehicle data 746 to, for example, reconcile the third correlated vehicle data 743 and the fourth correlated vehicle data 746.

Figure 8:
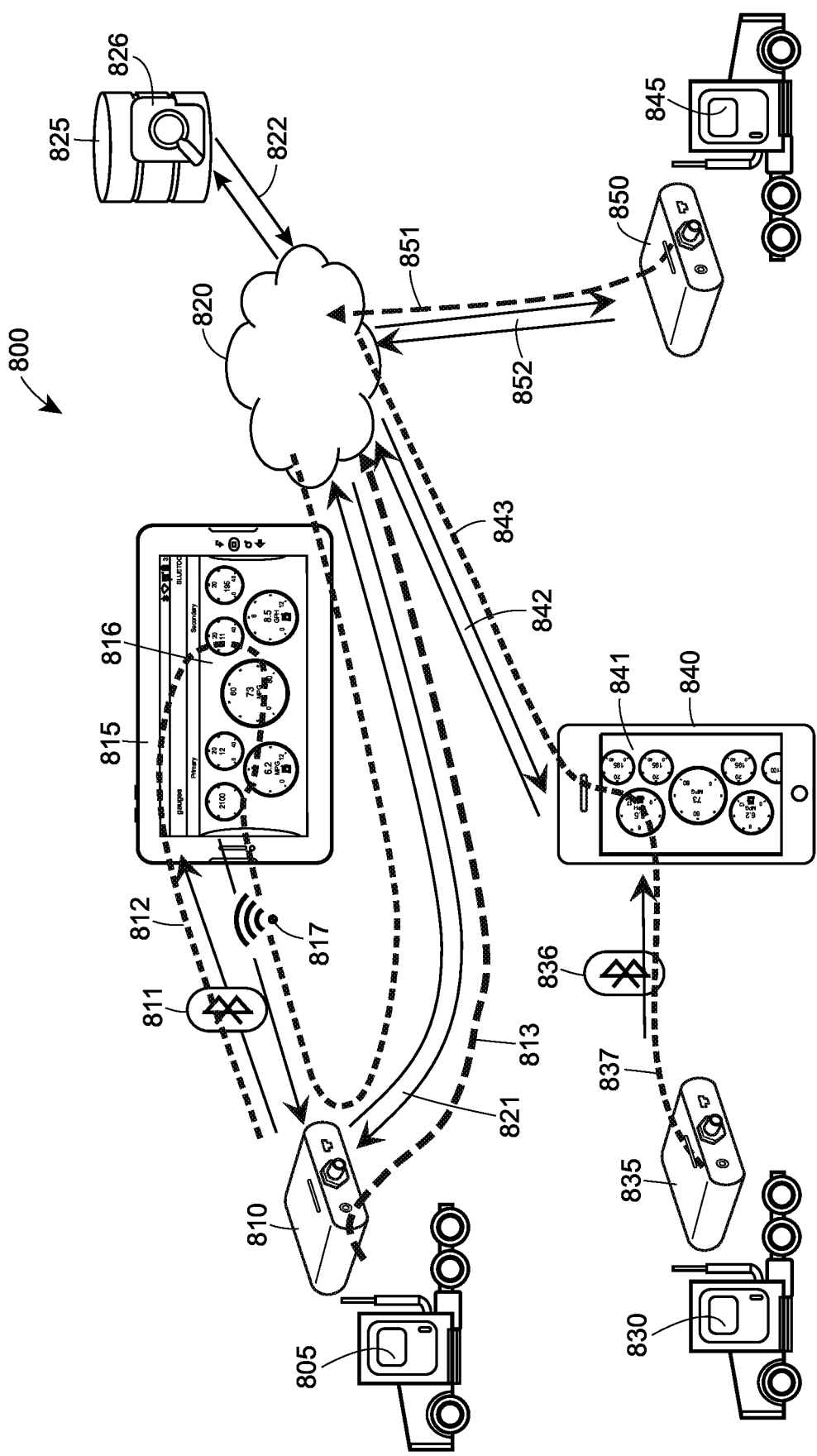
FIG. 8 depicts an example electronic data logging system including three vehicles, each vehicle having a respective vehicle electronic device in communication with either a respective personal electronic device and/or a remote electronic device.

With reference to FIG. 8, an electronic data logging system 800 may include a first vehicle 805 having a first vehicle electronic device 810 configured to transmit first correlated vehicle data 812 to a first personal electronic device 815 via a first communication link 811 (e.g., a BLUETOOTH® link, a WI-FI® link, a cellular link, etc.). The first personal electronic device 815 may generate first hours of service (HOS) data, a first HOS report, a first driver vehicle inspection report (DVIR), first international fuel tax agreement (IFTA) data, a first gauges display 816, or any combination thereof, based on the first correlated vehicle data and/or first vehicle data. The first personal electronic device 815 may transmit the first vehicle data, the first correlated vehicle data, the first hours of service (HOS) data, the international fuel tax agreement (IFTA) data, or any combination thereof, to a remote electronic device 825 via a cloud based communication network 820 (e.g., an Internet network). The remote electronic device 825 may store the first vehicle data, the first correlated vehicle data, the first hours of service (HOS) data, the international fuel tax agreement (IFTA) data, or any combination thereof, on a memory 826. The first personal electronic device 815 and the remote electronic device 825 may periodically transmit first correlated vehicle data 817 and second correlated vehicle data 822 to, for example, reconcile the first correlated vehicle data 817 and the second correlated vehicle data 822. As further illustrated in FIG. 8, the first vehicle electronic device 810 may transmit the first correlated vehicle data and/or first vehicle data 813 directly to the cloud network 820 (e.g., an Internet network, a wide area network (WAN), etc.) via a communication link 821 (e.g., a cellular network, a satellite network, etc.).

The electronic data logging system 800 may also include a second vehicle 830 having a second vehicle electronic device 835 configured to transmit third correlated vehicle data 837 to a second personal electronic device 840 via a third communication link (e.g., a cellular network) 836. The second personal electronic device 840 may generate second hours of service (HOS) data, a second HOS report, a second driver vehicle inspection report (DVIR), second international fuel tax agreement (IFTA) data, a second gauges display 841, or any combination thereof, based on the third correlated vehicle data and/or second vehicle data. The second personal electronic device 840 may transmit the second vehicle data, the second correlated vehicle data, the second hours of service (HOS) data, the second international fuel tax agreement (IFTA) data, or any combination thereof, to the remote electronic device 825 via the cloud based communication network 820 (e.g., an Internet network). The remote electronic device 825 may store the second vehicle data, the third correlated vehicle data, the second hours of service (HOS) data, the second international fuel tax agreement (IFTA) data, or any combination thereof, on the memory 826. The second personal electronic device 840 and the remote electronic device 825 may periodically transmit third correlated vehicle data 843 and fourth correlated vehicle data 842 to, for example, reconcile the third correlated vehicle data 843 and the fourth correlated vehicle data 842.

The electronic data logging system 800 may further include a third vehicle 845 having a third vehicle electronic device 850 communicatively couple to the cloud based communication network 820 via a fifth communication link 852 to transmit fifth correlated vehicle data 851. The third personal electronic device 850 and the remote electronic device 825 may periodically transmit the fifth correlated vehicle data 851 and sixth correlated vehicle data to, for example, reconcile the fifth correlated vehicle data 851 and the sixth correlated vehicle data.

Figure 9:
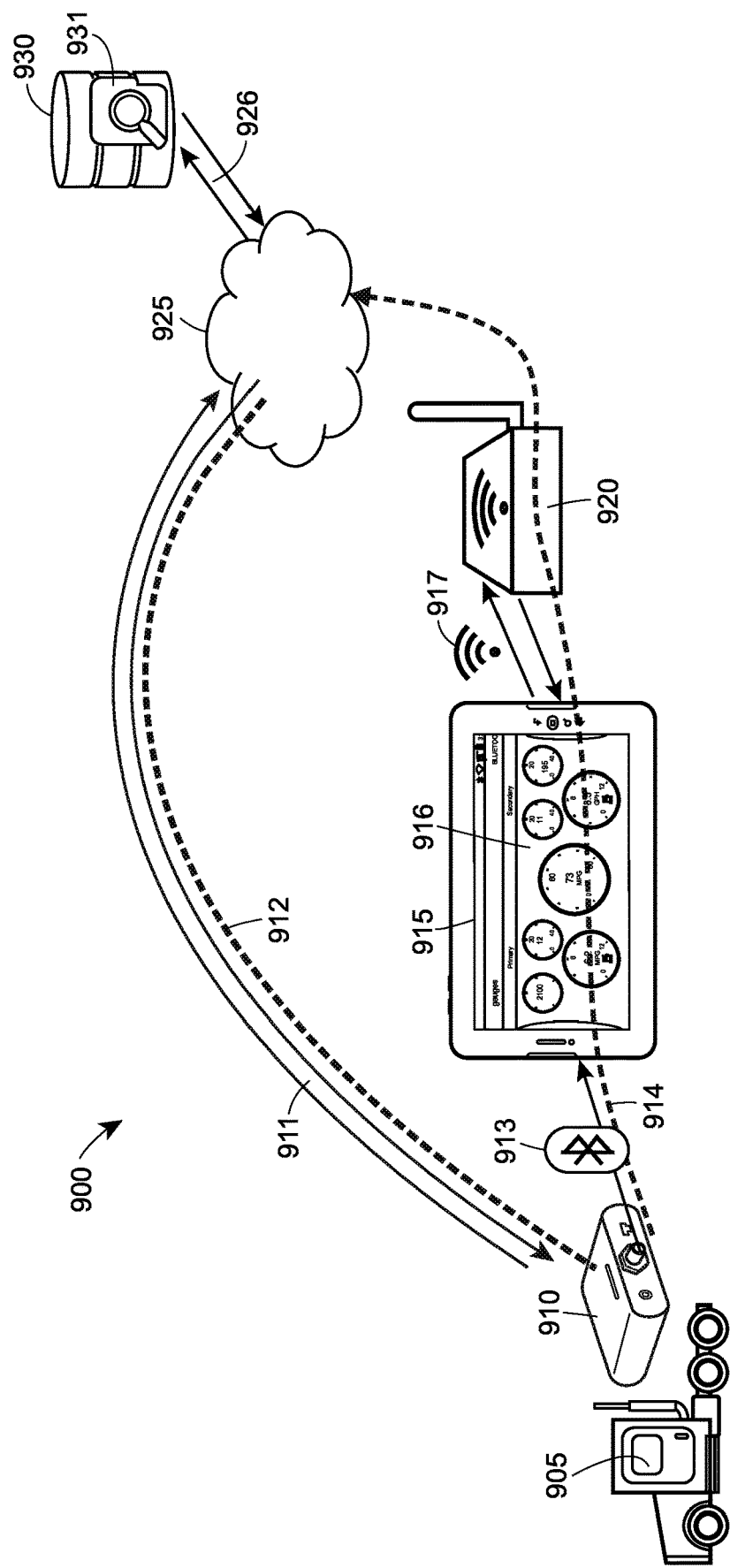
FIG. 9 depicts an example electronic data logging system including a vehicle having a vehicle electronic device in communication with a personal electronic device and a remote electronic device.

Turning to FIG. 9, an electronic data logging system 900 may include a first vehicle 905 having a first vehicle electronic device 910 configured to transmit correlated vehicle data 914 to a personal electronic device 915 via a first communication link 913 (e.g., a BLUETOOTH® link, a WI-FI® link, a USB link, etc.). The personal electronic device 915 may generate second hours of service (HOS) data, a second HOS report, a second driver vehicle inspection report (DVIR), second international fuel tax agreement (IFTA) data, a second gauges display 916, or any combination thereof, based on the third correlated vehicle data and/or second vehicle data. The personal electronic device 915 may transmit the vehicle data, the correlated vehicle data, the second hours of service (HOS) data, the second international fuel tax agreement (IFTA) data, or any combination thereof, to the remote electronic device 930 via a wireless communication link 917, a wireless modem 920 and the cloud based communication network 925 (e.g., an Internet network). The remote electronic device 930 may store the second vehicle data, the third correlated vehicle data, the second hours of service (HOS) data, the second international fuel tax agreement (IFTA) data, or any combination thereof, on the memory 931. The personal electronic device 915 and the remote electronic device 930 may periodically transmit the correlated vehicle data 914 and second correlated vehicle data 926 to, for example, reconcile the correlated vehicle data 914 and the second correlated vehicle data 926. As further illustrated in FIG. 9, the vehicle electronic device 910 may transmit the correlated vehicle data and/or the vehicle data 912 directly to the cloud network 925 (e.g., an Internet network, a wide area network (WAN), etc.) via a communication link 911 (e.g., a cellular network, a satellite network, etc.).

Figure 10:
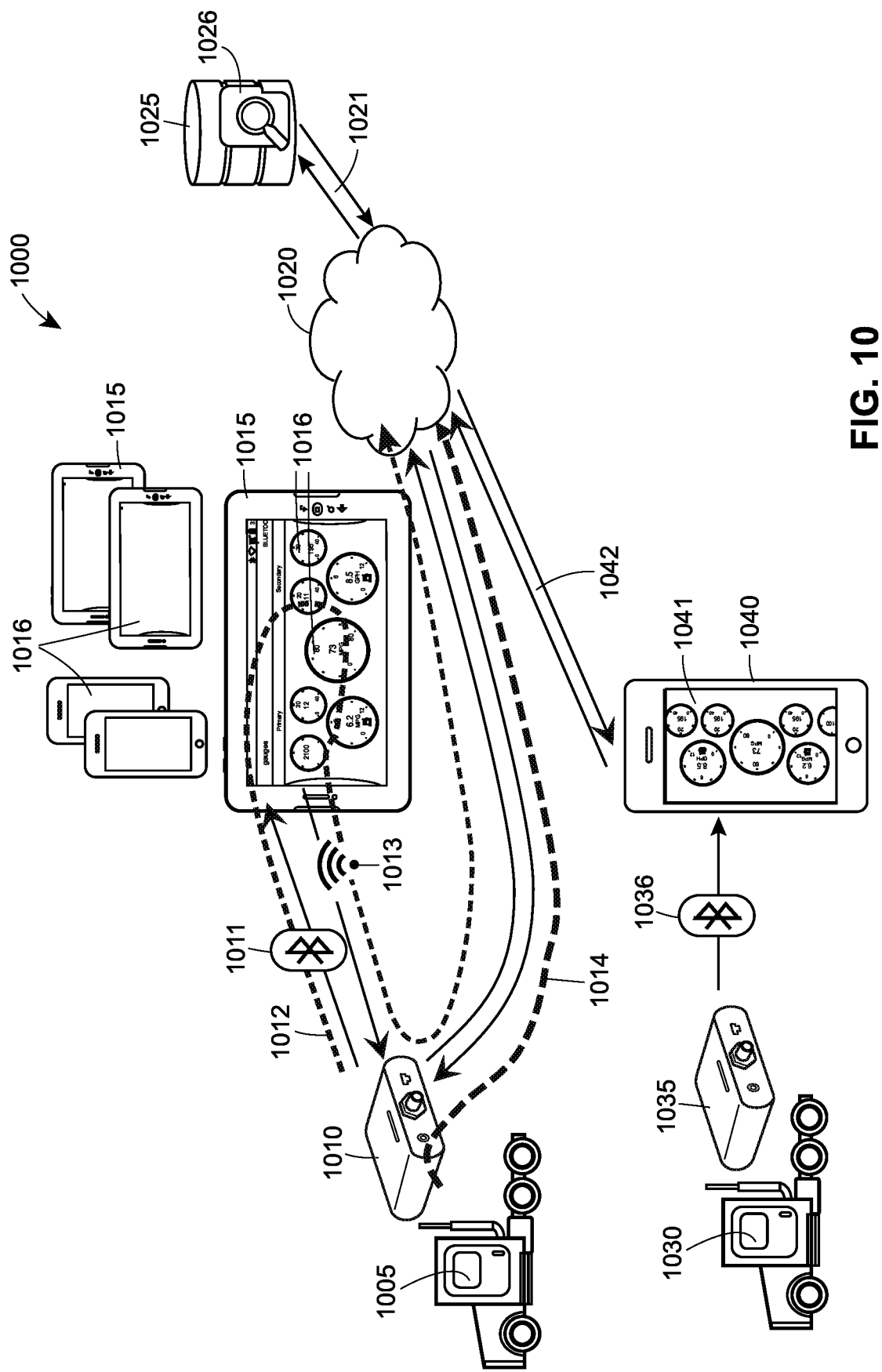
FIG. 10 depicts an example electronic data logging system including two vehicles, each vehicle having a respective vehicle electronic device in communication with a respective personal electronic device and/or a remote electronic device.

With reference to FIG. 10, an electronic data logging system 1000 may include a first vehicle 1005 having a first vehicle electronic device 1010 configured to transmit first correlated vehicle data 1012 to a first plurality of personal electronic device 1015 via a first communication link 1011 (e.g., a BLUETOOTH® link, a WI-FI® link, a USB link, etc.) or to a remote electronic device 1025 via a first vehicle electronic device 1010, a communication link 1014 and a cloud based communication network 1020(e.g., an Internet network). Any one of, or all of, the first plurality of personal electronic devices 1015 may generate first hours of service (HOS) data, a first HOS report, a first driver vehicle inspection report (DVIR), first international fuel tax agreement (IFTA) data, a first gauges display 1016, or any combination thereof, based on the first correlated vehicle data and/or first vehicle data. The first plurality of personal electronic devices 1015 may transmit the first vehicle data, the first correlated vehicle data, the first hours of service (HOS) data, the international fuel tax agreement (IFTA) data, or any combination thereof, to a remote electronic device 1025 via the first vehicle electronic device 1010 and a cloud based communication network 1020 (e.g., an Internet network). The remote electronic device 1025 may store the first vehicle data, the first correlated vehicle data, the first hours of service (HOS) data, the international fuel tax agreement (IFTA) data, or any combination thereof, on a memory 1026. The first plurality of personal electronic device 1015 and the remote electronic device 1025 may periodically transmit first correlated vehicle data 1013 and second correlated vehicle data 1021 to, for example, reconcile the first correlated vehicle data 1013 and the second correlated vehicle data 1021.

The electronic data logging system 1000 may also include a second vehicle 1030 having a second vehicle electronic device 1035 configured to transmit third correlated vehicle data to a second personal electronic device 1040 via a third communication link 1036 (e.g., a BLUETOOTH® link, a WI-FI® link, a USB link, etc.). The second personal electronic device 1040 may generate second hours of service (HOS) data, a second HOS report, a second driver vehicle inspection report (DVIR), second international fuel tax agreement (IFTA) data, a second gauges display 741, or any combination thereof, based on the third correlated vehicle data and/or second vehicle data. The second personal electronic device 1040 may transmit the second vehicle data, the second correlated vehicle data, the second hours of service (HOS) data, the second international fuel tax agreement (IFTA) data, or any combination thereof, to the remote electronic device 1025 via the cloud based communication network 1020. The remote electronic device 1025 may store the second vehicle data, the third correlated vehicle data, the second hours of service (HOS) data, the second international fuel tax agreement (IFTA) data, or any combination thereof, on the memory 1026. The second personal electronic device 1040 and the remote electronic device 1025 may periodically transmit third correlated vehicle data 1042 and fourth correlated vehicle data 1021 to, for example, reconcile the third correlated vehicle data 1042 and the fourth correlated vehicle data 1021.

Figure 11:
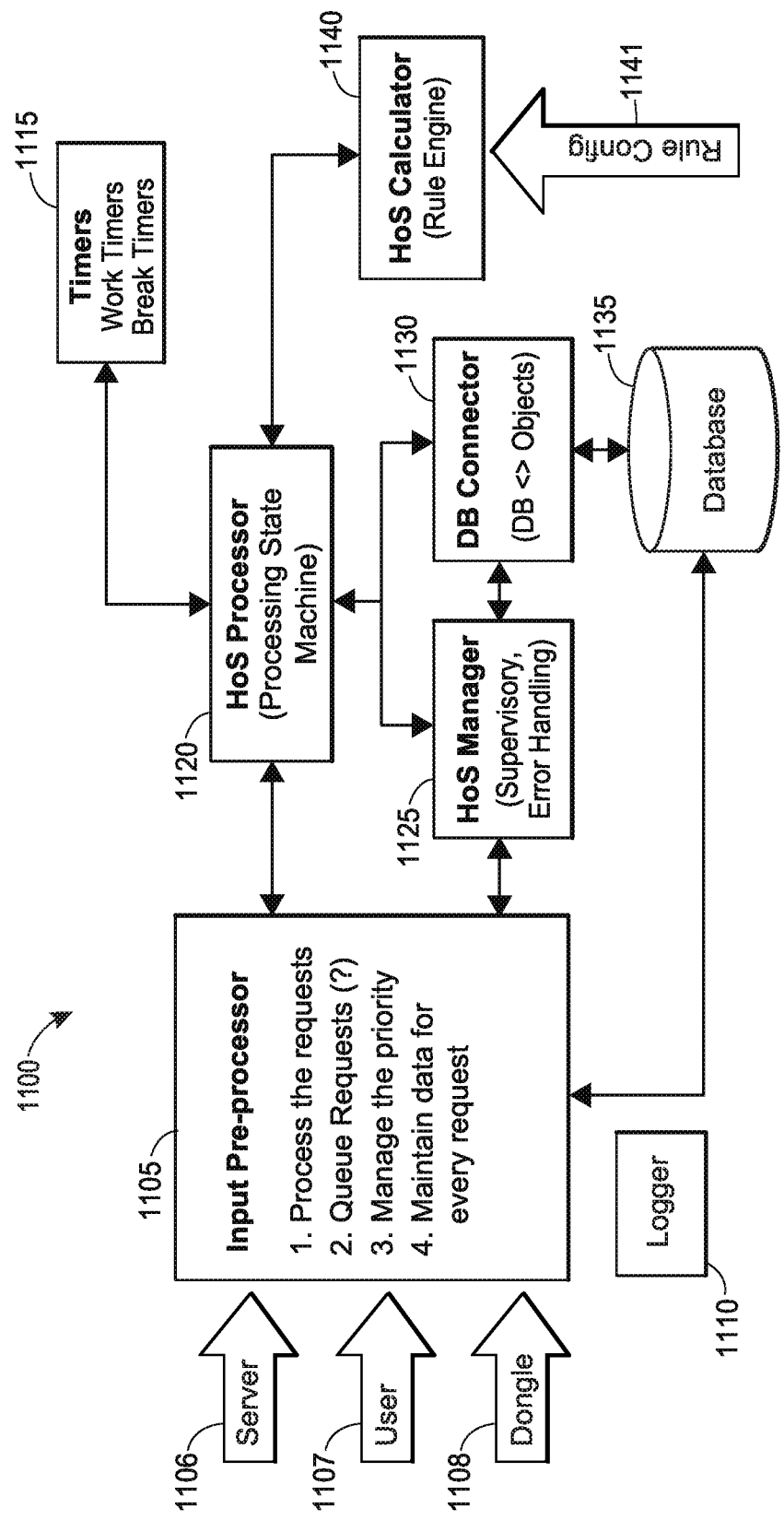
FIG. 11 depicts a block diagram of an example electronic data logging system.

Turning to FIG. 11, an electronic data logging system 1100 (e.g., an hours service (HOS) calculator engine) may be incorporated into, for example, a personal electronic device (e.g., personal electronic device 120 of FIG. 1) and may include an input pre-processor 1105 configured to receive a server input 1106, a user input 1107, and a vehicle electronic device input 1108, and further configured to process requests, queue requests, manage priority, and maintain data for the requests. The electronic data logging system 1100 may also include a logger 1110, timers 1115 (e.g., work timers, break timers, etc.) an hours of service (HOS) processor 1120 (e.g., a processing state machine), an hours of service (HOS) manager 1125 for supervisory functions and error handling, a database connector 1130, a database 1135, and an hours of service (HOS) calculator 1140 (e.g., a rule engine) for receiving rule configuration 1141.

Figure 12:
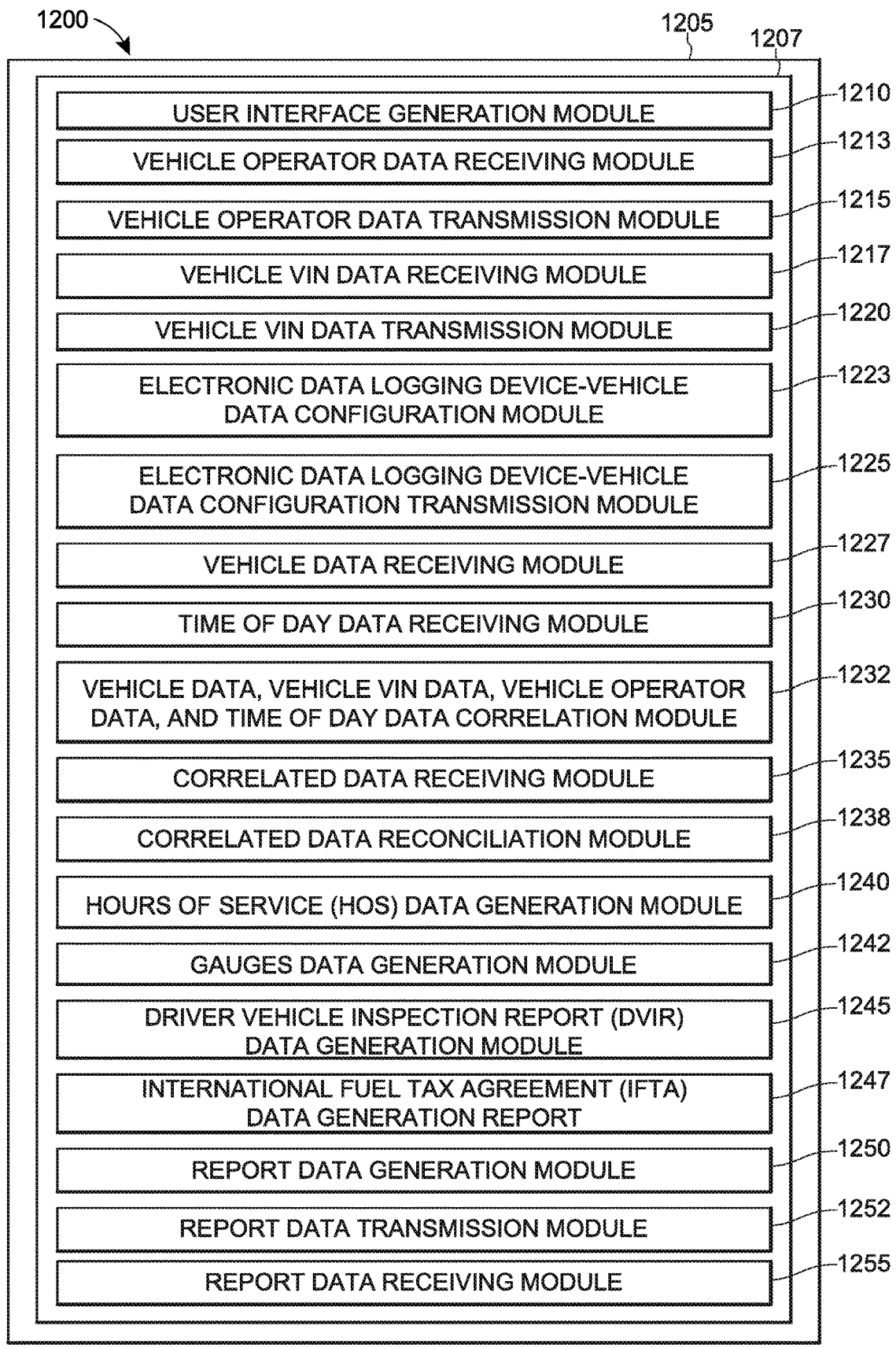
FIG. 12 depicts a block diagram of an example personal electronic device.

With referenced to FIG. 12, an electronic data logging system 1200 may include a personal electronic device 1205 having a user interface generation module 1210; a vehicle operator data receiving module 1213; a vehicle operator data transmission module 1215; a vehicle identification number (VIN) data receiving module 1217; a VIN data transmission module 1220; an electronic data logging device—vehicle data configuration module 1223; an electronic data logging device—vehicle data configuration transmission module 1225; a vehicle data receiving module 1227; a time of day data receiving module 1230; a vehicle data, VIN data, vehicle operator data, and time of day data correlation module 1232; a correlated data receiving module 1235; a correlated data reconciliation module 1238; an hours of service (HOS) data generation module 1240; a gauges data generation module 1242; a driver vehicle inspection report (DVIR) data generation module 1245; an international fuel tax agreement (IFTA) data generation module 1247; a report data generation module 1250; a report data transmission module 1252; and a report data receiving module 1255, stored on, for example, a non-transitory computer-readable medium 1207 in a form of computer-readable instructions.

While the user interface generation module 1210; the vehicle operator data receiving module 1213; the vehicle operator data transmission module 1215; the vehicle identification number (VIN) data receiving module 1217; the VIN data transmission module 1220; the electronic data logging device—vehicle data configuration module 1223; the electronic data logging device—vehicle data configuration transmission module 1225; the vehicle data receiving module 1227; the time of day data receiving module 1230; the vehicle data, VIN data, vehicle operator data, and time of day data correlation module 1232; the correlated data receiving module 1235; the correlated data reconciliation module 1238; the hours of service (HOS) data generation module 1240; the gauges data generation module 1242; the driver vehicle inspection report (DVIR) data generation module 1245; the international fuel tax agreement (IFTA) data generation module 1247; the report data generation module 1250; the report data transmission module 1252; or the report data receiving module 1255 may be stored on the non-transitory computer-readable medium 1207 in the form of computer-readable instructions, any one of, all of, or any sub-combination of the user interface generation module 1210; the vehicle operator data receiving module 1213; the vehicle operator data transmission module 1215; the vehicle identification number (VIN) data receiving module 1217; the VIN data transmission module 1220; the electronic data logging device—vehicle data configuration module 1223; the electronic data logging device—vehicle data configuration transmission module 1225; the vehicle data receiving module 1227; the time of day data receiving module 1230; the vehicle data, VIN data, vehicle operator data, and time of day data correlation module 1232; the correlated data receiving module 1235; the correlated data reconciliation module 1238; the hours of service (HOS) data generation module 1240; the gauges data generation module 1242; the driver vehicle inspection report (DVIR) data generation module 1245; the international fuel tax agreement (IFTA) data generation module 1247; the report data generation module 1250; the report data transmission module 1252; or the report data receiving module 1255 may be implemented by hardware (e.g., one or more discrete component circuits, one or more application specific integrated circuits (ASICs), etc.), firmware (e.g., one or more programmable application specific integrated circuits (ASICs), one or more programmable logic devices (PLDs), one or more field programmable logic devices (FPLD), one or more field programmable gate arrays (FPGAs), etc.), and/or any combination of hardware, software and/or firmware. Furthermore, the personal electronic device 1205 of FIG. 12 may include one or more elements, processes and/or devices in addition to, or instead of, those illustrated in FIG. 12, and/or may include more than one of, any, or all of the illustrated elements, processes and devices.

Figure 13:
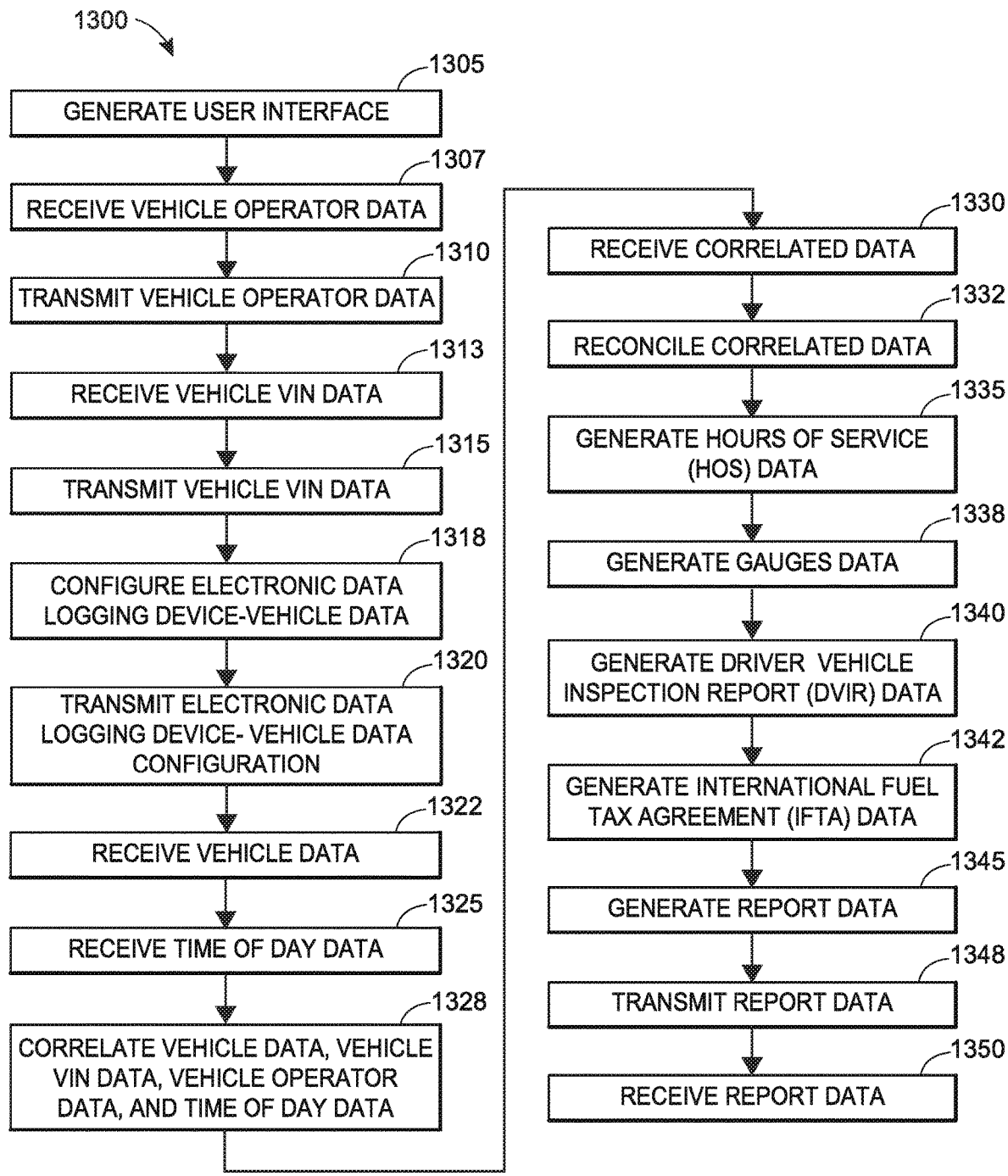
FIG. 13 depicts a flow diagram of an example method of operating a personal electronic device.

Turning to FIG. 13, a method of operating a personal electronic device 1300 may be implemented by a processor (e.g., a processor of the personal electronic device 120 of FIG. 1—"PED processor") executing, for example, modules 1210-1255 of FIG. 12. In particular, the PED processor may execute a user interface generation module 1210 to cause the PED processor to generate a user interface (block 1305). The user interface may, for example, enable a user to enter personal data and vehicle identification number (VIN) data. The personal data may include information associated with a commercial motor vehicle (CMV) company and an individual that works for the CMV company. Thus, the personal data may uniquely identify a particular vehicle operator. As described elsewhere herein, the VIN data may be automatically acquired from an associated vehicle control module in lieu of being entered by a user via the user interface. The user interface may also enable a user to edit vehicle data, personal data and/or any report data (e.g., HOS report data, DVIR report data, IFTA report data, vehicle original equipment manufacturer (OEM) report data, vehicle insurance company report data, etc.). For example, the user may, via the user interface, edit any of the data to correct errors, remove personal information, add data, remove data, reformat data, etc.

The PED processor may execute a vehicle operator data receiving module 1213 to cause the PED processor to receive the personal data entered by the user via the user interface (block 1307). The PED processor may execute a vehicle operator data transmission module 1215 to cause the PED processor to transmit the personal data to an associated vehicle electronic device (e.g., vehicle electronic device 110 of FIG. 1) (block 1310). The PED processor may execute a vehicle identification number (VIN) data receiving module 1217 to cause the PED processor to receive the VIN data entered by the user via the user interface (block 1313). The PED processor may execute a VIN data transmission module 1220 to cause the PED processor to transmit the VIN data to an associated vehicle electronic device (e.g., vehicle electronic device 110 of FIG. 1) (block 1315).

The PED processor may execute an electronic data logging device—vehicle data configuration module 1223 to cause the PED processor to enable a user to configure an associated vehicle electronic device (e.g., vehicle electronic device 110 of FIG. 1) (block 1318). For example, a user may configure the vehicle electronic device 110 to acquire a desired set of vehicle data from, for example, an associated vehicle electronic control module (e.g., ECM 115 of FIG. 1) (block 1318). The user may also specify a time-interval which the vehicle electronic device 110 is to acquire any given vehicle data (block 1318). The user may configure the vehicle electronic device 110 to acquire certain vehicle data more frequently than other vehicle data (block 1318). Alternatively, or additionally, any given vehicle electronic device 110 may be pre-configured to acquire pre-set vehicle data on a pre-set interval (block 1318).

The PED processor may execute an electronic data logging device—vehicle data configuration transmission module 1225 to cause the PED processor to transmit the vehicle electronic device configuration data to an associated vehicle electronic device (e.g., vehicle electronic device 110 of FIG. 1) (block 1320). The PED processor may execute a vehicle data receiving module 1227 to cause the PED processor to receive vehicle data from an associated vehicle electronic device (e.g., vehicle electronic device 110 of FIG. 1) (block 1322).

The PED processor may execute a time of day data receiving module 1230 to cause the PED processor to receive time of day data from, for example, an associated vehicle electronic device (e.g., vehicle electronic device 110 of FIG. 1) (block 1325). The time of day data may be, for example, representative of a time associated with when vehicle data was acquired and a day on which the vehicle data was acquired.

The PED processor may execute a vehicle data, VIN data, vehicle operator data, and time of day data correlation module 1232 to cause the PED processor to correlate the vehicle data with the VIN data, the vehicle operator data, and/or the time of day data (block 1328). For example, the PED processor may correlate the acquired vehicle data with a corresponding time and/or day at which the vehicle data was acquired or generated (block 1328). The PED processor may also correlate the vehicle data with a particular vehicle based on the VIN data (block 1328). The PED processor may also correlate the vehicle data with a particular vehicle operator (block 1328).

The PED processor may execute a correlated data receiving module 1235 to cause the PED processor to receive, for example, correlated vehicle data from an associated vehicle electronic device (e.g., vehicle electronic device 110 of FIG. 1) (block 1330). As described elsewhere herein, the vehicle electronic device 110 may generate correlated vehicle data in lieu of the personal electronic device 120 generating the correlated vehicle data.

The PED processor may execute a correlated data reconciliation module 1238 to cause the PED processor to reconcile, for example, first correlated vehicle data received from an associated vehicle electronic device (e.g., vehicle electronic device 110 of FIG. 1) with second correlated vehicle data received from an associated remote electronic device (e.g., remote electronic device 525 of FIG. 5) (block 1332). As a result of reconciling the first correlated vehicle data with the second correlated vehicle data (block 1332), both the personal electronic device 120 and the remote electronic device 525 may store, for example, a complete and accurate set of correlated vehicle data. Accordingly, if either the personal electronic device 120 or the remote electronic device are unable to access correlated vehicle data for some period of time (e.g., if either the personal electronic device 120 or the remote electronic device 525 is unable to communicate for some period of time) the vehicle data may be stored within a memory (e.g., memory 513 of FIG. 5) of the vehicle electronic device 110.

Similarly, vehicle data corresponding to a particular user will not be lost when, for example, the user does not log out of his personal electronic device 120 and/or when the user leaves an associated vehicle (e.g., vehicle 105 of FIG. 1) to go to another vehicle (e.g., vehicle 410 of FIG. 4) without having all of the vehicle data from the first vehicle 105 stored and/or transmitted. The apparatuses, systems and methods of the present disclosure may store vehicle data related to a particular user in an associated vehicle electronic device 110 until another user logs onto (or registers with) the given vehicle electronic device 110, When another user logs onto (or registers with) a given vehicle electronic device 110, the given vehicle electronic device may transmit all stored vehicle data to a remote electronic device prior to transmitting a new user id, associated with the new user, to the remote electronic device via another personal device. Subsequently, the remote electronic device (which may store all complete vehicle data for each user, no matter where the data originated from) may provide any lost data back to the personal electronic device of the first user.

The PED processor may execute an hours of service (HOS) data generation module 1240 to cause the PED processor to generate HOS data based on, for example, vehicle data, time of day data, and personal data (block 1335). The PED processor may further generate an HOS display (e.g., HOS display 210 of FIG. 2) based on the HOS data (block 1335).

The PED processor may execute a gauges data generation module 1242 to cause the PED processor to generate gauges data based on, for example, vehicle data (block 1338). The PED processor may generate gauges data that is further based on time of day data (block 1338). The PED processor may also generate a gauges display (e.g., gauges display 310 of FIG. 3) based on the gauges data.

The PED processor may execute a driver vehicle inspection report (DVIR) data generation module 1245 to cause the PED processor to generate DVIR data based on, for example, vehicle data (block 1340). The PED processor may generate DVIR data that is further based on time of day data and/or personal data (block 1340).

The PED processor may execute an international fuel tax agreement (IFTA) data generation module 1247 to cause the PED processor to generate IFTA data based on, for example, vehicle data (block 1342). The PED processor may generate IFTA data that is further based on time of day data and/or personal data (block 1342).

The PED processor may execute a report data generation module 1250 to cause the PED processor to generate report data based on, for example, any one of the HOS data, the DVIR data, the IFTA data, the vehicle data, or the correlated vehicle data (block 1345). The PED processor may execute a report data transmission module 1252 to cause the PED processor to transmit the report data to, for example, an associated remote electronic device (e.g., remote electronic device 525 of FIG. 5) or a third party electronic device (e.g., a vehicle manufacture) (block 1348). The PED processor may execute a report data receiving module 1255 to cause the PED processor to receive report data from, for example, an associated remote electronic device (e.g., remote electronic device 525 of FIG. 5) (block 1350). As described elsewhere herein, a remote electronic device (REP) processor of the remote electronic device 525 may generate report data based on, for example, HOS data, DVIR data, IFTA data, vehicle data, and/or correlated vehicle data.

As described above, the method 1300 may comprise a program (or module) for execution by a PED processor. The program (or module) may be embodied in software stored on a tangible (or non-transitory) computer readable storage medium such as a compact disc read-only memory ("CD-ROM"), a floppy disk, a hard drive, a DVD, BLU-RAY® disk, or a memory associated with the PED processor. The entire program (or module) and/or parts thereof could alternatively be executed by a device other than the PED processor and/or embodied in firmware or dedicated hardware (e.g., one or more discrete component circuits, one or more application specific integrated circuits (ASICs), etc.). Further, although the example program (or module) is described with reference to the flowchart illustrated in FIG. 13, many other methods of implementing the method 1300 may alternatively be used. For example, the order of execution of the blocks may be changed, and/or some of the blocks described may be changed, eliminated, or combined.

Figure 14:
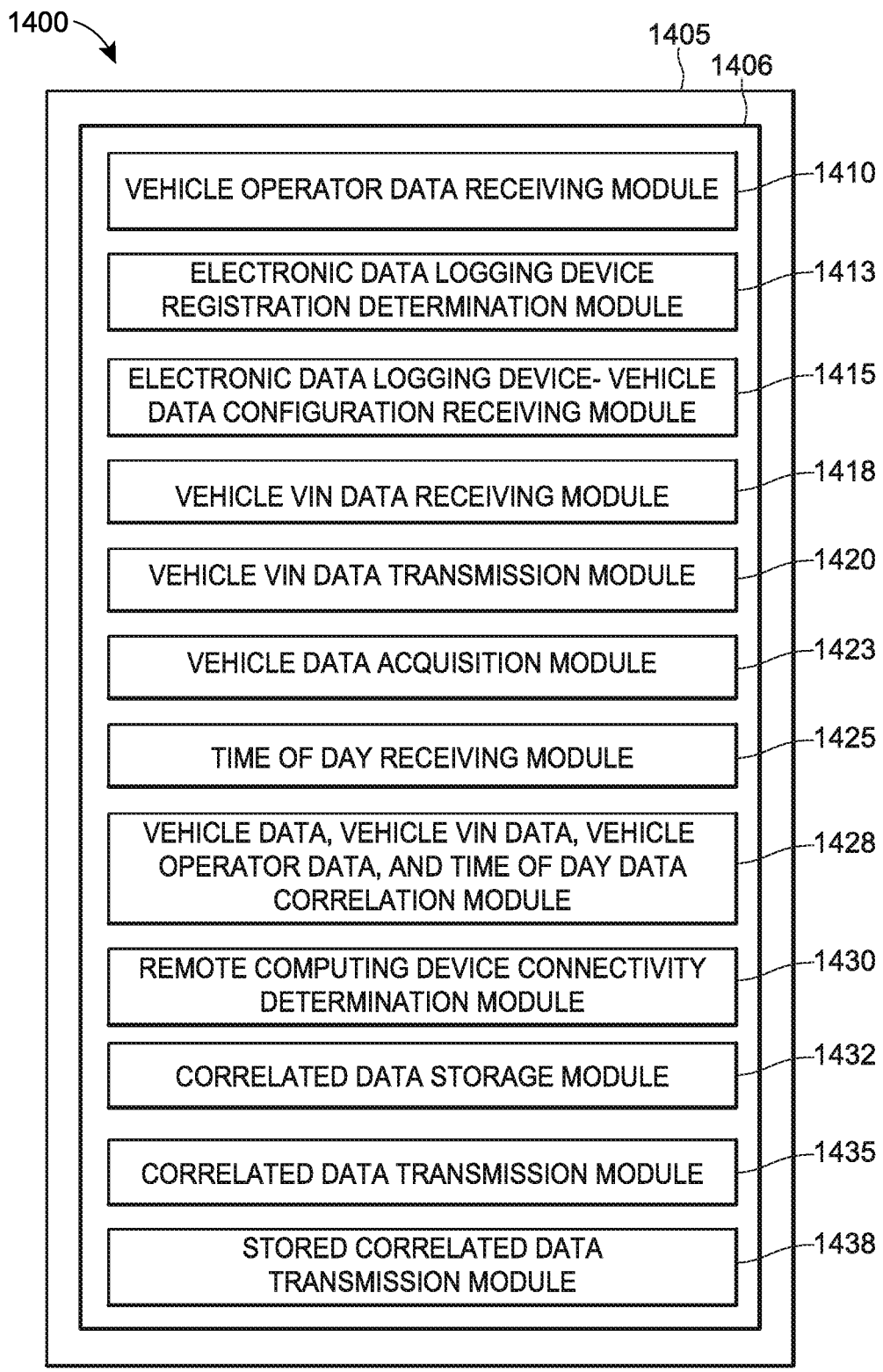
FIG. 14 depicts a block diagram of an example vehicle electronic device.

With reference to FIG. 14, an electronic data logging system 1400 may include a vehicle electronic device 1405 having a vehicle operator data receiving module 1410; an electronic data logging device registration determination module 1413; an electronic data logging device—vehicle data configuration receiving module 1415; a vehicle identification number (VIN) data receiving module 1418; a VIN data transmission module 1420; a vehicle data acquisition module 1423; a time of data receiving module 1425; a vehicle data, VIN data, vehicle operator data, and time of day data correlation module 1428; a remote computing device connectivity determination module 1430; a correlated data storage module 1432; a correlated data transmission module 1435; and a stored correlated data transmission module 1438, stored on, for example, a non-transitory computer-readable medium 1406 in a form of computer-readable instructions.

While any one of the vehicle operator data receiving module 1410; the electronic data logging device registration determination module 1413; the electronic data logging device—vehicle data configuration receiving module 1415; the vehicle identification number (VIN) data receiving module 1418; the VIN data transmission module 1420; the vehicle data acquisition module 1423; the time of data receiving module 1425; the vehicle data, VIN data, vehicle operator data, and time of day data correlation module 1428; the remote computing device connectivity determination module 1430; the correlated data storage module 1432; the correlated data transmission module 1435; or the stored correlated data transmission module 1438 may be stored on the non-transitory computer-readable medium 1406 in a form of computer-readable instructions, any one of, all of, or any sub-combination of the vehicle operator data receiving module 1410; the electronic data logging device registration determination module 1413; the electronic data logging device—vehicle data configuration receiving module 1415; the vehicle identification number (VIN) data receiving module 1418; the VIN data transmission module 1420; the vehicle data acquisition module 1423; the time of data receiving module 1425; the vehicle data, VIN data, vehicle operator data, and time of day data correlation module 1428; the remote computing device connectivity determination module 1430; the correlated data storage module 1432; the correlated data transmission module 1435; or the stored correlated data transmission module 1438 may be implemented by hardware (e.g., one or more discrete component circuits, one or more application specific integrated circuits (ASICs), etc.), firmware (e.g., one or more programmable application specific integrated circuits (ASICs), one or more programmable logic devices (PLDs), one or more field programmable logic devices (FPLD), one or more field programmable gate arrays (FPGAs), etc.), and/or any combination of hardware, software and/or firmware. Furthermore, the vehicle electronic device 1405 of FIG. 14 may include one or more elements, processes and/or devices in addition to, or instead of, those illustrated in FIG. 14, and/or may include more than one of, any, or all of the illustrated elements, processes and devices.

Figure 15:
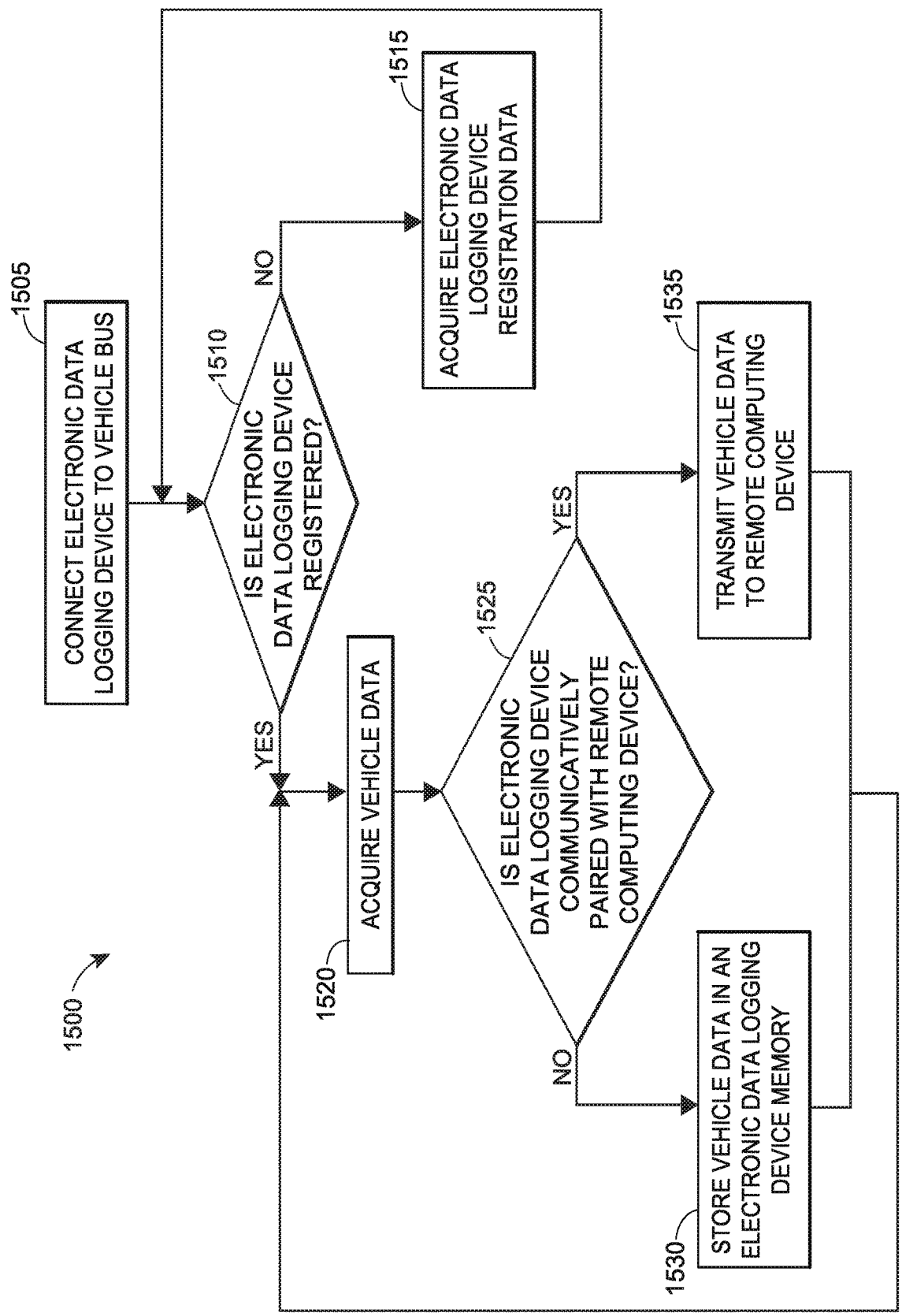
FIG. 15 depicts an flow diagram of an example method of storing and/or transmitting electronic data.

Turning to FIG. 15, a method of operating a vehicle electronic device 1500 may be implemented by a processor (e.g., a processor of the vehicle electronic device 110 of FIG. 1—"VED processor") executing, for example, modules 1410, 1413, 1415, 1423, 1430, 1432, 1438 of FIG. 14. In particular, a vehicle electronic device (e.g., vehicle electronic device 110 of FIG. 1) is connected to a vehicle (e.g., vehicle 105 of FIG. 1) bus (e.g., vehicle bus 511, 512 of FIG. 5) (block 1505).

The VED processor may execute an electronic data logging device registration determination module 1413 to cause the VED processor to determine if the vehicle electronic device 110 is registered (block 1510). The VED processor may determine that the vehicle electronic device 110 is registered if the VED processor has previously received personal data from, for example, an associated personal electronic device (e.g., personal electronic device 120 of FIG. 1). Alternatively, the VED processor may determine that the vehicle electronic device 110 is registered if the VED processor has previously received personal data and VIN data from, for example, an associated personal electronic device (e.g., personal electronic device 120 of FIG. 1) and VIN data from the personal electronic device 120 or an associated vehicle electronic control module (e.g., ECM 115 of FIG. 1). Notably, vehicle identification number (VIN) data may be automatically acquired from the ECM 115 in lieu of being received from the personal electronic device 120 when, for example, the VIN data is available via the ECM 115.

If the VED processor determines that the vehicle electronic device 110 is not registered (block 1510), the VED processor may execute a vehicle operator data receiving module 1410 to cause the VED processor to receive personal data from, for example, an associated personal electronic device (e.g., personal electronic device 120 of FIG. 1) (block 1515).

If the VED processor determines that the vehicle electronic device 110 is registered (block 1510), the VED processor may execute a vehicle data acquisition module 1423 to cause the VED processor to receive vehicle data from, for example, an associated vehicle electronic control module (e.g., ECM 115 of FIG. 1) (block 1520). The vehicle data may include, for example, any one of, all of, or any sub-combination of engine control unit history data, air supply pressure data, fuel consumption data, trip information data, vehicle speed data, vehicle cruise control status data, engine cooling fan drive status data, wheel speed data, vehicle service indication data, transmission control unit history data, body control unit history data, driver door status indicator data, passenger door indicator data, engine oil level data, engine oil pressure data, engine idle operation data, turbocharger status data, air start pressure data, steering wheel angle data, vehicle accelerometer data, vehicle pitch data, vehicle yaw data, vehicle distance data, idle shutdown data, engine hours data, engine revolutions data, time of day data, date of year data, vehicle hours data, vehicle direction data, vehicle speed data, fuel consumption data, vehicle weight data, cruise control speed set data, engine temperature data, power takeoff information data, fuel economy data, vehicle position (longitude/latitude/elevation) data, tire condition data, ambient conditions data, inlet air condition data, exhaust condition data, vehicle electrical power condition data, transmission fluid level data, transmission fluid pressure data, brake information data, engine coolant level data, engine coolant pressure data, vehicle odometer reading data, vehicle identification number data, crankcase pressure data, barometric pressure data, vehicle interior temperature data, air inlet temperature data, road surface temperature data, particulate trap inlet pressure data, boost pressure data, intake manifold temperature data, air inlet pressure data, air filter differential pressure data, exhaust gas temperature data, coolant filter differential pressure data, instantaneous fuel economy data, average fuel economy data, fuel temperature data, turbo oil temperature data, total fuel used data, trip fuel data, injector metering rail pressure data, injection control pressure data, percent fan speed data, engine-percent torque demand data, actual engine-percent torque data, accelerator pedal position data, percent load at current speed data, brake pedal position data, clutch pedal position data, water in fuel sensor data, etc.

The VED processor may execute a remote computing device connectivity determination module 1430 to determine if a remote computing device (e.g., a personal electronic device 120 of FIG. 1, or a remote electronic device 525 of FIG. 5) is communicatively connected to the vehicle electronic device 110 (block 1525). The VED processor may determine if a remote computing device is communicatively connected to the vehicle electronic device 110 by, for example, pinging for remote computing devices proximate the vehicle electronic device (block 1525)

If the VED processor determines that a remote computing device is not communicatively connected to the vehicle electronic device 110 (block 1525), the VED processor may execute a correlated data storage module 1432 to cause the VED processor to store correlated vehicle data in a memory (e.g., storage memory 513 of FIG. 5) (block 1530).

If the VED processor determines that a remote computing device is communicatively connected to the vehicle electronic device 110 (block 1525), the VED processor may execute a stored correlated data transmission module 1438 to cause the VED processor to transmit correlated vehicle data and/or stored correlated vehicle data to, for example, a remote computing device (e.g., a personal electronic device 120 of FIG. 1, or a remote electronic device 525 of FIG. 5) (block 1535).

As described above, the method 1500 may comprise a program (or module) for execution by a VED processor. The program (or module) may be embodied in software stored on a tangible (or non-transitory) computer readable storage medium such as a compact disc read-only memory ("CD-ROM"), a floppy disk, a hard drive, a DVD, BLU-RAY® disk, or a memory associated with the VED processor. The entire program (or module) and/or parts thereof could alternatively be executed by a device other than the VED processor and/or embodied in firmware or dedicated hardware (e.g., one or more discrete component circuits, one or more application specific integrated circuits (ASICs), etc.). Further, although the example program (or module) is described with reference to the flowchart illustrated in FIG. 15, many other methods of implementing the method 1500 may alternatively be used. For example, the order of execution of the blocks may be changed, and/or some of the blocks described may be changed, eliminated, or combined.

Figure 16:
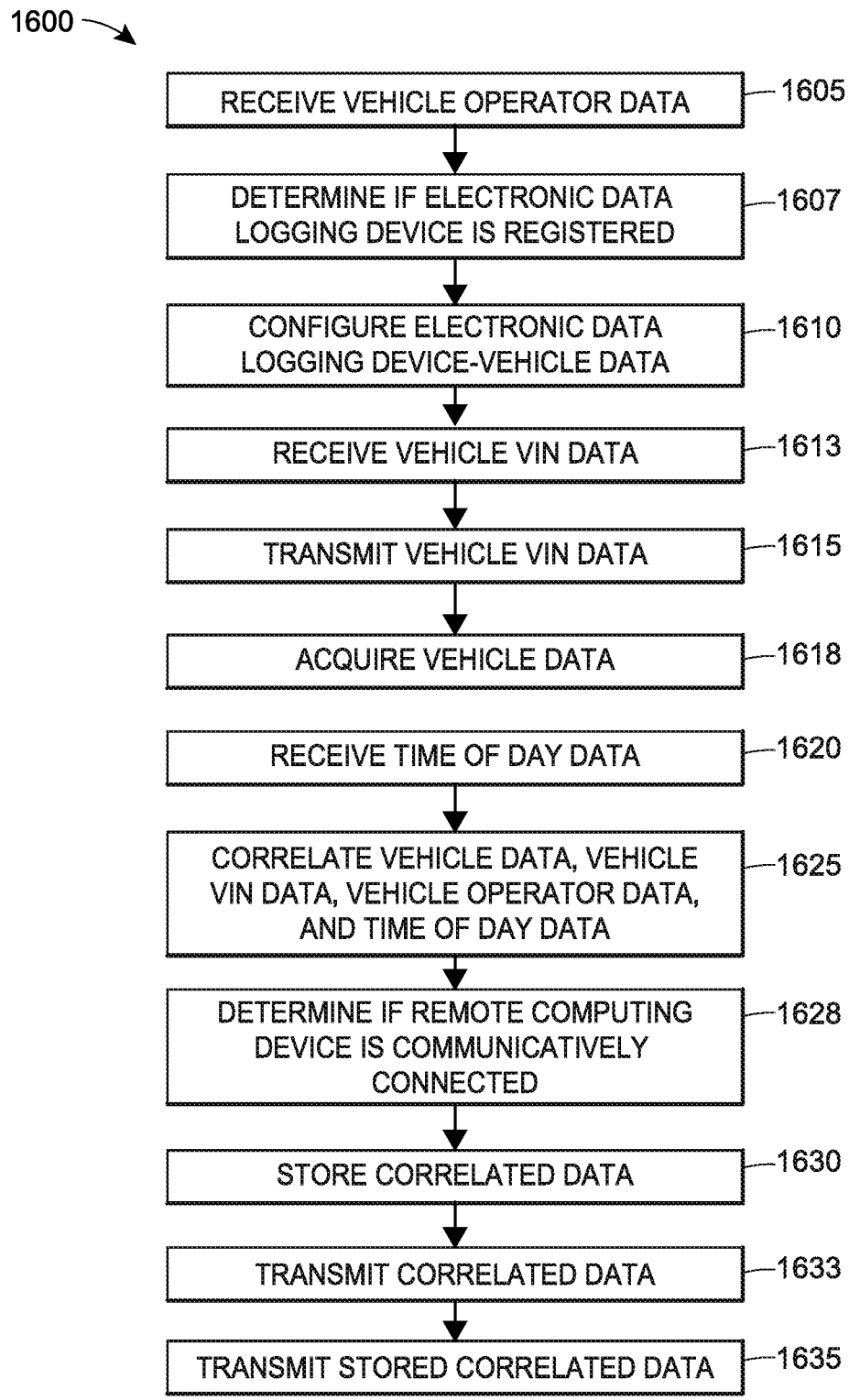
FIG. 16 depicts a flow diagram of an example method of operating a vehicle electronic device.

With reference to FIG. 16, a method of operating a vehicle electronic device 1600 may be implemented by a processor (e.g., a processor of the vehicle electronic device 110 of FIG. 1—"VED processor") executing, for example, modules 1410-1438 of FIG. 14. In particular, the VED processor may execute a vehicle operator data receiving module 1410 to cause the VED processor to receive personal data from, for example, an associated personal electronic device (e.g., personal electronic device 120 of FIG. 1) (block 1605).

The VED processor may execute an electronic data logging device registration determination module 1413 to cause the VED processor to determine if the vehicle electronic device 110 is registered (block 1607). The VED processor may determine that the vehicle electronic device 110 is registered if the VED processor has previously received personal data from, for example, an associated personal electronic device (e.g., personal electronic device 120 of FIG. 1). Alternatively, the VED processor may determine that the vehicle electronic device 110 is registered if the VED processor has previously received personal data and VIN data from, for example, an associated personal electronic device (e.g., personal electronic device 120 of FIG. 1) and VIN data from the personal electronic device 120 or an associated vehicle electronic control module (e.g., ECM 115 of FIG. 1).

If the VED processor determines that the vehicle electronic device 110 is not registered (block 1607), the VED processor may execute a vehicle operator data receiving module 1410 to cause the VED processor to receive personal data from, for example, an associated personal electronic device (e.g., personal electronic device 120 of FIG. 1) (block 1605).

The VED processor may execute an electronic data logging device—vehicle data configuration receiving module 1415 to cause the VED processor to receive vehicle electronic device configuration data (block 1610). For example, a user may configure the vehicle electronic device 110 to acquire a desired set of vehicle data from, for example, an associated vehicle electronic control module (e.g., ECM 115 of FIG. 1) (block 1610). The user may also specify a time-interval which the vehicle electronic device 110 is to acquire any given vehicle data (block 1610). The user may configure the vehicle electronic device 110 to acquire certain vehicle data more frequently than other vehicle data (block 1610). Alternatively, or additionally, any given vehicle electronic device 110 may be pre-configured to acquire pre-set vehicle data on a pre-set interval (block 1610).

The VED processor may execute a vehicle identification number (VIN) data receiving module 1418 to cause the VED processor to receive VIN data from, for example, a vehicle control module (e.g., ECM 115 of FIG. 1) or a personal electronic device (e.g., a personal electronic device 120 of FIG. 1) (block 1613). The VED processor may execute a VIN data transmission module 1420 to cause the VED processor to transmit VIN data to, for example, a personal electronic device (e.g., a personal electronic device 120 of FIG. 1) or a remote electronic device (e.g., a remote electronic device 525 of FIG. 5) (block 1615).

If the VED processor determines that the vehicle electronic device 110 is registered (block 1607), the VED processor may execute a vehicle data acquisition module 1423 to cause the VED processor to receive vehicle data from, for example, an associated vehicle electronic control module (e.g., ECM 115 of FIG. 1) (block 1618). The vehicle data may include, for example, any one of, all of, or any sub-combination of engine control unit history data, air supply pressure data, fuel consumption data, trip information data, vehicle speed data, vehicle cruise control status data, engine cooling fan drive status data, wheel speed data, vehicle service indication data, transmission control unit history data, body control unit history data, driver door status indicator data, passenger door indicator data, engine oil level data, engine oil pressure data, engine idle operation data, turbocharger status data, air start pressure data, steering wheel angle data, vehicle accelerometer data, vehicle pitch data, vehicle yaw data, vehicle distance data, idle shutdown data, engine hours data, engine revolutions data, time of day data, date of year data, vehicle hours data, vehicle direction data, vehicle speed data, fuel consumption data, vehicle weight data, cruise control speed set data, engine temperature data, power takeoff information data, fuel economy data, vehicle position (longitude/latitude/elevation) data, tire condition data, ambient conditions data, inlet air condition data, exhaust condition data, vehicle electrical power condition data, transmission fluid level data, transmission fluid pressure data, brake information data, engine coolant level data, engine coolant pressure data, vehicle odometer reading data, vehicle identification number data, crankcase pressure data, barometric pressure data, vehicle interior temperature data, air inlet temperature data, road surface temperature data, particulate trap inlet pressure data, boost pressure data, intake manifold temperature data, air inlet pressure data, air filter differential pressure data, exhaust gas temperature data, coolant filter differential pressure data, instantaneous fuel economy data, average fuel economy data, fuel temperature data, turbo oil temperature data, total fuel used data, trip fuel data, injector metering rail pressure data, injection control pressure data, percent fan speed data, engine-percent torque demand data, actual engine-percent torque data, accelerator pedal position data, percent load at current speed data, brake pedal position data, clutch pedal position data, water in fuel sensor data, etc.

The VED processor may execute a time of data receiving module 1425 to cause the VED processor to receive time of day data from, for example, a vehicle control module (e.g., ECM 115 of FIG. 1) (block 1620). The time of day data may be, for example, representative of a time associated with when vehicle data was acquired and a day on which the vehicle data was acquired.

The VED processor may execute a vehicle data, VIN data, vehicle operator data, and time of day data correlation module 1428 to cause the PED processor to correlate the vehicle data with the VIN data, the vehicle operator data, and/or the time of day data (block 1625). For example, the VED processor may correlate the acquired vehicle data with a corresponding time and/or day at which the vehicle data was acquired or generated (block 1625). The VED processor may also correlate the vehicle data with a particular vehicle based on the VIN data (block 1625). The VED processor may also correlate the vehicle data with a particular vehicle operator (block 1625).

The VED processor may execute a remote computing device connectivity determination module 1430 to determine if a remote computing device (e.g., a personal electronic device 120 of FIG. 1, or a remote electronic device 525 of FIG. 5) is communicatively connected to the vehicle electronic device 110 (block 1628). The VED processor may determine if a remote computing device is communicatively connected to the vehicle electronic device 110 by, for example, pinging for remote computing devices proximate the vehicle electronic device (block 1628)

If the VED processor determines that a remote computing device is not communicatively connected to the vehicle electronic device 110 (block 1628), the VED processor may execute a correlated data storage module 1432 to cause the VED processor to store correlated vehicle data in a memory (e.g., storage memory 513 of FIG. 5) (block 1630).

If the VED processor determines that a remote computing device is not communicatively connected to the vehicle electronic device 110 (block 1628), the VED processor may execute a correlated data transmission module 1435 to cause the VED processor to transmit correlated vehicle data and/or stored correlated vehicle data to a remote computing device (e.g., a personal electronic device 120 of FIG. 1, or a remote electronic device 525 of FIG. 5) (block 1633).

If the VED processor determines that a remote computing device is communicatively connected to the vehicle electronic device 110 (block 1628), the VED processor may execute a stored correlated data transmission module 1438 to cause the VED processor to transmit correlated vehicle data to, for example, a remote computing device (e.g., a personal electronic device 120 of FIG. 1, or a remote electronic device 525 of FIG. 5) (block 1635).

As described above, the method 1600 may comprise a program (or module) for execution by a VED processor. The program (or module) may be embodied in software stored on a tangible (or non-transitory) computer readable storage medium such as a compact disc read-only memory ("CD-ROM"), a floppy disk, a hard drive, a DVD, BLU-RAY® disk, or a memory associated with the VED processor. The entire program (or module) and/or parts thereof could alternatively be executed by a device other than the VED processor and/or embodied in firmware or dedicated hardware (e.g., one or more discrete component circuits, one or more application specific integrated circuits (ASICs), etc.). Further, although the example program (or module) is described with reference to the flowchart illustrated in FIG. 16, many other methods of implementing the method 1600 may alternatively be used. For example, the order of execution of the blocks may be changed, and/or some of the blocks described may be changed, eliminated, or combined.

Figure 17:
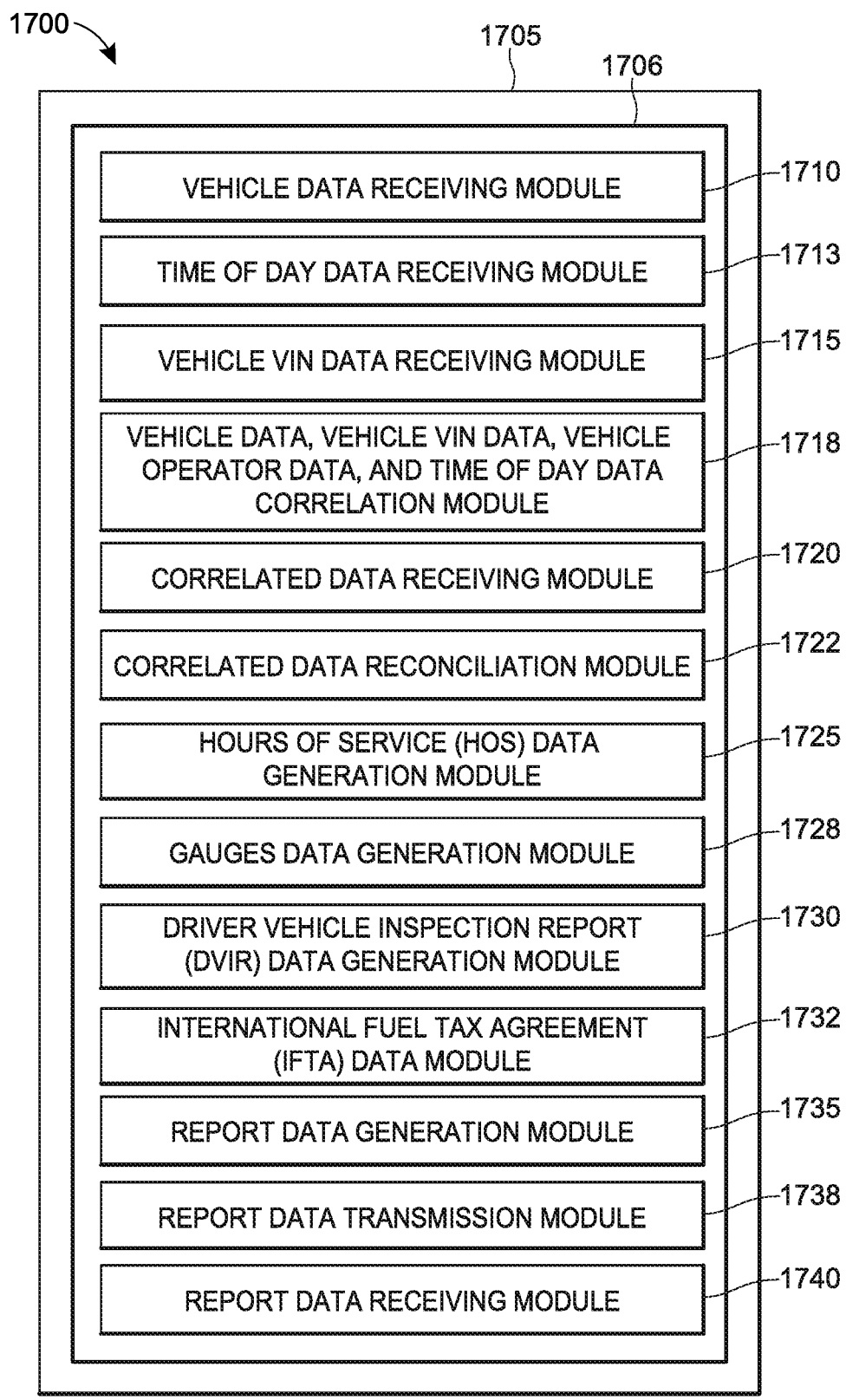
FIG. 17 depicts a block diagram of an example remote electronic device.

Turning to FIG. 17, an electronic data logging system 1700 may include a remote electronic device 1705 having a vehicle data receiving module 1710; a time of day data receiving module 1713; a vehicle identification number (VIN) data receiving module 1715; a vehicle data, VIN data, vehicle operator data, and time of day data correlation module 1718; a correlated data receiving module 1720; a correlated data reconciliation module 1722; an hours of service (HOS) data generation module 1725; a gauges data generation module 1728; a driver vehicle inspection report (DVIR) data generation module 1730; an international fuel tax agreement (IFTA) data module 1732; a report data generation module 1735; a report data transmission module 1738; and a report data receiving module 1740, stored on, for example, a non-transitory computer-readable medium 1706 in the form of computer-readable instructions.

While any one of the vehicle data receiving module 1710; the time of day data receiving module 1713; the vehicle identification number (VIN) data receiving module 1715; the vehicle data, VIN data, vehicle operator data, and time of day data correlation module 1718; the correlated data receiving module 1720; the correlated data reconciliation module 1722; the hours of service (HOS) data generation module 1725; the gauges data generation module 1728; the driver vehicle inspection report (DVIR) data generation module 1730; the international fuel tax agreement (IFTA) data module 1732; the report data generation module 1735; the report data transmission module 1738; or the report data receiving module 1740 may be stored on the non-transitory computer-readable medium 1706 in the form of computer-readable instructions, any one of, all of, or any sub-combination of the vehicle data receiving module 1710; the time of day data receiving module 1713; the vehicle identification number (VIN) data receiving module 1715; the vehicle data, VIN data, vehicle operator data, and time of day data correlation module 1718; the correlated data receiving module 1720; the correlated data reconciliation module 1722; the hours of service (HOS) data generation module 1725; the gauges data generation module 1728; the driver vehicle inspection report (DVIR) data generation module 1730; the international fuel tax agreement (IFTA) data module 1732; the report data generation module 1735; the report data transmission module 1738; or the report data receiving module 1740 may be implemented by hardware (e.g., one or more discrete component circuits, one or more application specific integrated circuits (ASICs), etc.), firmware (e.g., one or more programmable application specific integrated circuits (ASICs), one or more programmable logic devices (PLDs), one or more field programmable logic devices (FPLD), one or more field programmable gate arrays (FPGAs), etc.), and/or any combination of hardware, software and/or firmware. Furthermore, the remote electronic device 1705 of FIG. 17 may include one or more elements, processes and/or devices in addition to, or instead of, those illustrated in FIG. 17, and/or may include more than one of, any, or all of the illustrated elements, processes and devices.

Figure 18:
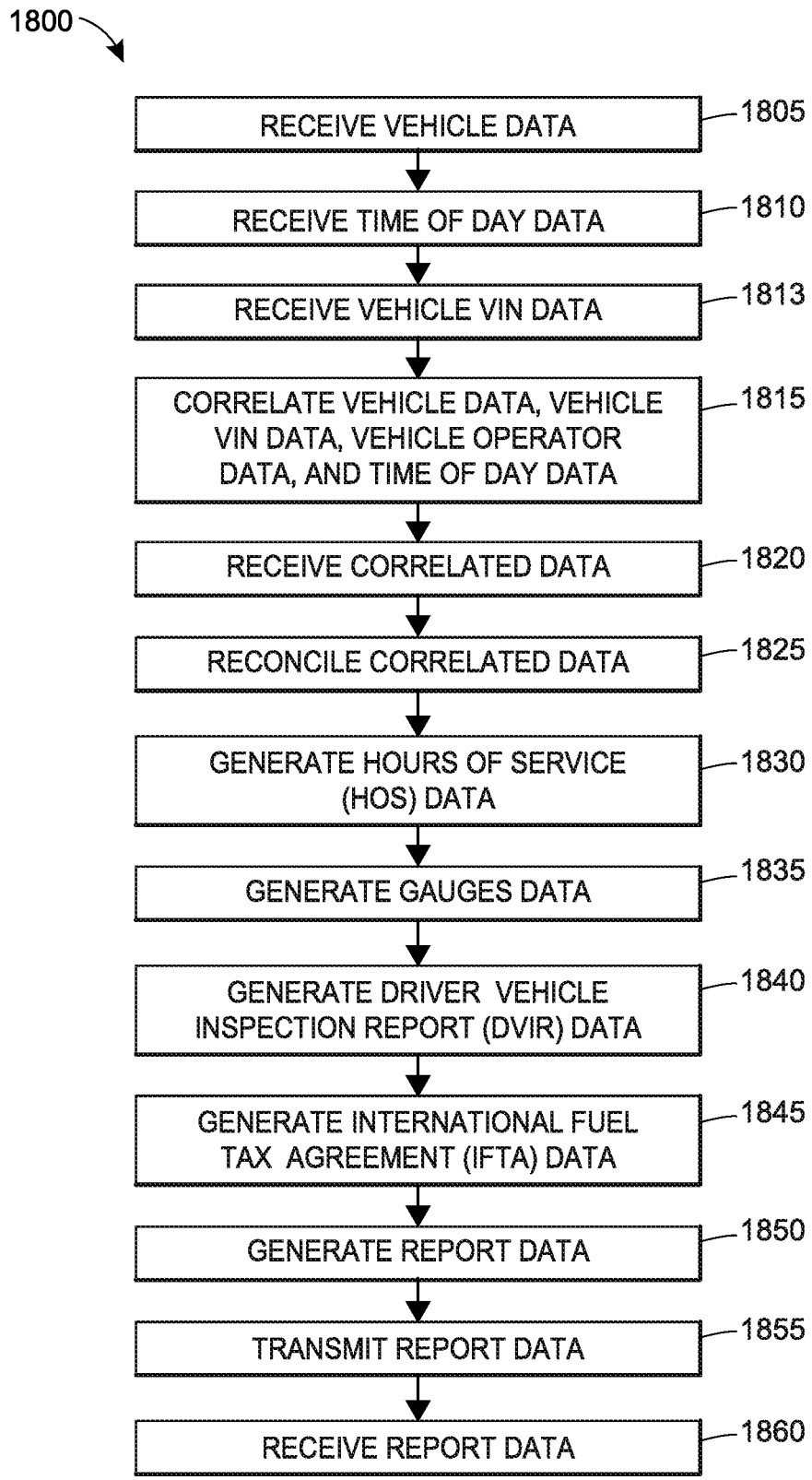
FIG. 18 depicts a flow diagram of an example method of operating a remote electronic device.

With reference to FIG. 18, a method of operating a vehicle electronic device 1800 may be implemented by a processor (e.g., a processor of the remote electronic device 525 of FIG. 5—"RED processor") executing, for example, modules 1710-1740 of FIG. 17. In particular, the RED processor may execute a vehicle data acquisition module 1710 to cause the RED processor to receive vehicle data from, for example, an associated vehicle electronic control module (e.g., ECM 115 of FIG. 1) (block 1805). The vehicle data may include, for example, any one of, all of, or any sub-combination of engine control unit history data, air supply pressure data, fuel consumption data, trip information data, vehicle speed data, vehicle cruise control status data, engine cooling fan drive status data, wheel speed data, vehicle service indication data, transmission control unit history data, body control unit history data, driver door status indicator data, passenger door indicator data, engine oil level data, engine oil pressure data, engine idle operation data, turbocharger status data, air start pressure data, steering wheel angle data, vehicle accelerometer data, vehicle pitch data, vehicle yaw data, vehicle distance data, idle shutdown data, engine hours data, engine revolutions data, time of day data, date of year data, vehicle hours data, vehicle direction data, vehicle speed data, fuel consumption data, vehicle weight data, cruise control speed set data, engine temperature data, power takeoff information data, fuel economy data, vehicle position (longitude/latitude/elevation) data, tire condition data, ambient conditions data, inlet air condition data, exhaust condition data, vehicle electrical power condition data, transmission fluid level data, transmission fluid pressure data, brake information data, engine coolant level data, engine coolant pressure data, vehicle odometer reading data, vehicle identification number data, crankcase pressure data, barometric pressure data, vehicle interior temperature data, air inlet temperature data, road surface temperature data, particulate trap inlet pressure data, boost pressure data, intake manifold temperature data, air inlet pressure data, air filter differential pressure data, exhaust gas temperature data, coolant filter differential pressure data, instantaneous fuel economy data, average fuel economy data, fuel temperature data, turbo oil temperature data, total fuel used data, trip fuel data, injector metering rail pressure data, injection control pressure data, percent fan speed data, engine-percent torque demand data, actual engine-percent torque data, accelerator pedal position data, percent load at current speed data, brake pedal position data, clutch pedal position data, water in fuel sensor data, etc.

The RED processor may execute a time of data receiving module 1713 to cause the RED processor to receive time of day data from, for example, a vehicle control module (e.g., ECM 115 of FIG. 1) (block 1810). The time of day data may be, for example, representative of a time associated with when vehicle data was acquired and a day on which the vehicle data was acquired.

The RED processor may execute a vehicle identification number (VIN) data receiving module 1715 to cause the VED processor to receive VIN data from, for example, a vehicle control module (e.g., ECM 115 of FIG. 1) or a personal electronic device (e.g., a personal electronic device 120 of FIG. 1) (block 1813).

The RED processor may execute a vehicle data, VIN data, vehicle operator data, and time of day data correlation module 1718 to cause the PED processor to correlate the vehicle data with the VIN data, the vehicle operator data, and/or the time of day data (block 1815). For example, the RED processor may correlate the acquired vehicle data with a corresponding time and/or day at which the vehicle data was acquired or generated (block 1815). The RED processor may also correlate the vehicle data with a particular vehicle based on the VIN data (block 1815). The RED processor may also correlate the vehicle data with a particular vehicle operator (block 1815).

The RED processor may execute a correlated data receiving module 1720 to cause the RED processor to receive, for example, correlated vehicle data from an associated vehicle electronic device (e.g., vehicle electronic device 110 of FIG. 1) (block 1820). As described elsewhere herein, the vehicle electronic device 110 may generate correlated vehicle data in lieu of the remote electronic device 525 generating the correlated vehicle data.

The RED processor may execute a correlated data reconciliation module 1722 to cause the RED processor to reconcile, for example, first correlated vehicle data received from an associated vehicle electronic device (e.g., vehicle electronic device 110 of FIG. 1) with second correlated vehicle data received from an associated remote electronic device (e.g., remote electronic device 525 of FIG. 5) (block 1825). As a result of reconciling the first correlated vehicle data with the second correlated vehicle data (block 1825), both the personal electronic device 120 and the remote electronic device 525 may store, for example, a complete and accurate set of correlated vehicle data. Accordingly, if either the personal electronic device 120 or the remote electronic device are unable to access correlated vehicle data for some period of time (e.g., if either the personal electronic device 120 or the remote electronic device 525 is unable to communicate for some period of time).

The RED processor may execute an hours of service (HOS) data generation module 1725 to cause the RED processor to generate HOS data based on, for example, vehicle data, time of day data, and personal data (block 1830). The RED processor may further generate an HOS display (e.g., HOS display 210 of FIG. 2) based on the HOS data (block 1830).

The RED processor may execute a gauges data generation module 1728 to cause the RED processor to generate gauges data based on, for example, vehicle data (block 1835). The RED processor may generate gauges data that is further based on time of day data (block 1835). The RED processor may also generate a gauges display (e.g., gauges display 310 of FIG. 3) based on the gauges data.

The RED processor may execute a driver vehicle inspection report (DVIR) data generation module 1730 to cause the RED processor to generate DVIR data based on, for example, vehicle data (block 1840). The RED processor may generate DVIR data that is further based on time of day data and/or personal data (block 1840).

The RED processor may execute an international fuel tax agreement (IFTA) data generation module 1732 to cause the RED processor to generate IFTA data based on, for example, vehicle data (block 1845). The RED processor may generate IFTA data that is further based on time of day data and/or personal data (block 1845).

The RED processor may execute a report data generation module 1735 to cause the RED processor to generate report data based on, for example, any one of the HOS data, the DVIR data, the IFTA data, the vehicle data, or the correlated vehicle data (block 1850). The RED processor may execute a report data transmission module 1738 to cause the RED processor to transmit the report data to, for example, an associated remote electronic device (e.g., remote electronic device 525 of FIG. 5) or a third party electronic device (e.g., a vehicle manufacture) (block 1855). The RED processor may execute a report data receiving module 1740 to cause the RED processor to receive report data from, for example, an associated remote electronic device (e.g., remote electronic device 525 of FIG. 5) (block 1860). The REP processor may generate report data based on, for example, HOS data, DVIR data, IFTA data, vehicle data, and/or correlated vehicle data.

Additionally, the RED processor may execute a user interface generation module 1210 to cause the RED processor to generate a user interface. The user interface may, for example, enable a user to enter personal data and vehicle identification number (VIN) data. The personal data may include information associated with a commercial motor vehicle (CMV) company and an individual that works for the CMV company. Thus, the personal data may uniquely identify a particular vehicle operator. As described elsewhere herein, the VIN data may be automatically acquired from an associated vehicle control module in lieu of being entered by a user via the user interface. The user interface may also enable a user to edit vehicle data, personal data and/or any report data (e.g., HOS report data, DVIR report data, IFTA report data, vehicle original equipment manufacturer (OEM) report data, vehicle insurance company report data, etc.). For example, the user may, via the user interface, edit any of the data to correct errors, remove personal information, add data, remove data, reformat data, etc.

As described above, the method 1800 may comprise a program (or module) for execution by a RED processor. The program (or module) may be embodied in software stored on a tangible computer readable storage medium such as a compact disc read-only memory ("CD-ROM"), a floppy disk, a hard drive, a DVD, BLU-RAY® disk, or a memory associated with the RED processor. The entire program (or module) and/or parts thereof could alternatively be executed by a device other than the RED processor and/or embodied in firmware or dedicated hardware (e.g., one or more discrete component circuits, one or more application specific integrated circuits (ASICs), etc.). Further, although the example program (or module) is described with reference to the flowchart illustrated in FIG. 18, many other methods of implementing the method 1800 may alternatively be used. For example, the order of execution of the blocks may be changed, and/or some of the blocks described may be changed, eliminated, or combined.

Numerous modifications to the apparatuses, systems, and methods disclosed herein will be apparent to those skilled in the art in view of the foregoing description. Accordingly, this description is to be construed as illustrative only, and is presented for the purpose of enabling those skilled in the art to make and use the invention and to teach the preferred mode of carrying out same. The exclusive rights to all modifications within the scope of the disclosure and the appended claims are reserved.

What is claimed is:

1. A vehicle electronic device, comprising:
a processor and a memory within the vehicle electronic device;
a physical vehicle data bus connector, wherein the physical vehicle data bus connector is configured to be physically connected to a vehicle data bus selected from: a J1939 protocol vehicle data bus, a J1708 protocol vehicle data bus, or an OBDII protocol vehicle data bus;
a vehicle data acquisition module, stored on the memory within the vehicle electronic device, that, when executed by the processor within the vehicle electronic device, causes the processor to receive vehicle data from the vehicle data bus;
a time data acquisition module, stored on the memory within the vehicle electronic device, that, when executed by the processor within the vehicle electronic device, causes the processor to receive time data, wherein the time data includes information related to a time of day;
a time-stamped vehicle data generation module, stored on the memory within the vehicle electronic device, that, when executed by the processor within the vehicle electronic device, causes the processor to generate time-stamped vehicle data based on the vehicle data and the time data, wherein the time-stamped vehicle data includes the vehicle data correlated with the time data;
a personal data acquisition module, stored on the memory within the vehicle electronic device, that, when executed by the processor within the vehicle electronic device, causes the processor to receive personal data, wherein the personal data includes information associated with a particular vehicle operator; and
a correlated vehicle data generation module, stored on the memory within the vehicle electronic device, that, when executed by the processor within the vehicle electronic device, causes the processor within the vehicle electronic device to generate correlated vehicle data based on the time-stamped vehicle data and the personal data, wherein the correlated vehicle data is representative of an association between the time-stamped vehicle data and the personal data.

2. The device of claim 1, further comprising:
a personal electronic device availability determination module, stored on the memory within the vehicle electronic device, that, when executed by the processor within the vehicle electronic device, causes the processor to determine whether the vehicle electronic device is communicatively coupled with a personal electronic device, wherein when the processor determines that the vehicle electronic device is communicatively coupled with the personal electronic device, the processor transmits the correlated vehicle data to the personal electronic device, and wherein when the processor determines that the vehicle electronic device is not communicatively coupled with the personal electronic device, the processor stores the correlated vehicle data on the memory of the vehicle electronic device.

3. The device of claim 2, further comprising:
a correlated data reconciliation module, stored on the memory, that, when executed by the processor, causes the processor to reconcile correlated vehicle data stored in a memory of the vehicle electronic device with correlated vehicle data stored in the memory of the personal electronic device.

4. The device of claim 1, further comprising:
a correlated data transmission module, stored on the memory, that, when executed by the processor, causes the processor to transmit the correlated vehicle data to a remote electronic device.

5. The device of claim 1, further comprising:
an electronic data logging device registration determination module, stored on the memory, that, when executed by the processor, causes the processor to register the vehicle electronic device with the particular vehicle operator and a particular vehicle based on the personal data and the vehicle data, wherein the vehicle data includes vehicle identification number data, and wherein the personal data includes particular vehicle operator data.

6. A non-transitory, computer-readable, medium, comprising:
a personal data acquisition module that, when executed by a processor within a vehicle electronic device, causes the processor to receive personal data, wherein the personal data includes information associated with a particular vehicle operator;
an electronic data logging device registration determination module that, when executed by the processor of the vehicle electronic device, causes the processor to register the vehicle electronic device with the particular vehicle operator in response to receiving the personal data;
a vehicle data acquisition module that, when executed by the processor, causes the processor to receive vehicle data, directly from a vehicle via a physical vehicle data bus, at the vehicle electronic device when the processor determines that the vehicle electronic device is registered with the particular vehicle operator, wherein the physical vehicle data bus is selected from: a J1939 protocol vehicle data bus, a J1708 protocol vehicle data bus, or an OBDII protocol vehicle data bus;
a time data acquisition module that, when executed by the processor, causes the processor to receive time data at the processor of the vehicle electronic device, wherein the time data includes information related to a time of day; and
a time-stamped vehicle data generation module that, when executed by the processor, causes the processor to generate time-stamped vehicle data, wherein the time-stamped vehicle data includes the vehicle data correlated with the time data.

7. The non-transitory, computer-readable, medium of claim 6, further comprising:
a correlated data transmission module that, when executed by a processor, causes the processor to transmit the correlated vehicle data to a remote electronic device.

8. The non-transitory, computer-readable, medium of claim 6, further comprising:
a personal electronic device availability determination module that, when executed by the processor, causes the processor to determine whether the vehicle electronic device is communicatively coupled with a personal electronic device, wherein when the processor determines that the vehicle electronic device is communicatively coupled with the personal electronic device, the processor transmits the correlated vehicle data to the personal electronic device, and wherein when the processor determines that the vehicle electronic device is not communicatively coupled with the personal electronic device, the processor stores the correlated vehicle data on a memory of the vehicle electronic device.

9. The non-transitory, computer-readable, medium of claim 8, further comprising:
a correlated data reconciliation module that, when executed by the processor, causes the processor to reconcile correlated vehicle data stored in a memory of the vehicle electronic device with correlated vehicle data stored in the memory of the personal electronic device.

10. The non-transitory, computer-readable, medium of claim 6, wherein the vehicle data includes at least one of: engine control unit history data, air supply pressure data, fuel consumption data, trip information data, vehicle speed data, vehicle cruise control status data, engine cooling fan drive status data, wheel speed data, vehicle service indication data, transmission control unit history data, body control unit history data, driver door status indicator data, passenger door indicator data, engine oil level data, engine oil pressure data, engine idle operation data, turbocharger status data, air start pressure data, steering wheel angle data, vehicle accelerometer data, vehicle pitch data, vehicle yaw data, vehicle distance data, idle shutdown data, engine hours data, engine revolutions data, time of day data, date of year data, vehicle hours data, vehicle direction data, fuel consumption data, vehicle weight data, cruise control speed set data, engine temperature data, power takeoff information data, fuel economy data, vehicle position (longitude/ latitude/elevation) data, tire condition data, ambient conditions data, inlet air condition data, exhaust condition data, vehicle electrical power condition data, transmission fluid level data, transmission fluid pressure data, brake information data, engine coolant level data, engine coolant pressure data, vehicle odometer reading data, vehicle identification number data, crankcase pressure data, barometric pressure data, vehicle interior temperature data, air inlet temperature data, road surface temperature data, particulate trap inlet pressure data, boost pressure data, intake manifold temperature data, air inlet pressure data, air filter differential pressure data, exhaust gas temperature data, coolant filter differential pressure data, instantaneous fuel economy data, average fuel economy data, fuel temperature data, turbo oil temperature data, total fuel used data, trip fuel data, injector metering rail pressure data, injection control pressure data, percent fan speed data, engine-percent torque demand data, actual engine-percent torque data, accelerator pedal position data, percent load at current speed data, brake pedal position data, clutch pedal position data, or water in fuel sensor data.

11. An electronic data logging system, comprising:
a personal electronic device having a first processor and a first memory;
a personal data acquisition module, stored on the first memory, that, when executed by the first processor, causes the first processor to receive personal data, wherein the personal data includes information associated with a particular vehicle operator; and
a personal data transmission module, stored on the first memory, that, when executed by the first processor, causes the first processor to transmit the personal data to a vehicle electronic device that is registered with the particular vehicle operator;
and the vehicle electronic device having a second processor and a second memory;
a personal data receiving module, stored on the second memory, that, when executed by the second processor, causes the second processor to receive the personal data from the first processor;
a vehicle data acquisition module, stored on the second memory, that, when executed by the second processor, causes the second processor to receive vehicle data, directly from a vehicle via a data bus of the vehicle, in response to receiving the personal data;
a time data acquisition module, stored on the second memory, that, when executed by the second processor, causes the second processor to receive time data;
a time-stamped vehicle data generation module, stored on the second memory, that, when executed by the second processor, causes the second processor to generate time-stamped vehicle data, wherein the time-stamped vehicle data includes the vehicle data correlated with the time data;
a personal electronic device availability determination module, stored on the second memory, that, when executed by the second processor, causes the second processor to determine whether the vehicle electronic device is communicatively coupled with the personal electronic device, wherein when the second processor determines that the vehicle electronic device is communicatively coupled with the personal electronic device, the second processor transmits the time-stamped vehicle data to the personal electronic device, and wherein when the second processor determines that the vehicle electronic device is not communicatively coupled with the personal electronic device, the second processor stores the time-stamped vehicle data on the second memory; and
at least one of:
a data edit module, stored on the second memory, that, when executed by the second processor, causes the second processor to edit any one of: the personal data, the time data, or the time-stamped data, to perform at least one of: correct errors, remove personal information, add data, remove data, or reformat data, or
a correlated data reconciliation module, stored on the second memory, that, when executed by the second processor, causes the second processor to reconcile time-stamped data stored in the first memory of the vehicle electronic device with time-stamped data stored in the second memory of the personal electronic device.

12. The system of claim 11, further comprising:
an hours of service data generation module, stored on the first memory, that, when executed by the first processor, causes the first processor to generate hours of service data, wherein the hours of service data is representative of at least one of: a number of hours the particular vehicle operator was off duty, a number of hours the particular vehicle operator was in a sleeper birth, a number of hours the particular vehicle operator was driving, or a number of hours the particular vehicle operator was on duty but not driving.

13. The system of claim 11, further comprising:
correlated data storage module, stored on the first memory, that, when executed by the first processor, causes the first processor to store hours of service data on the first memory.

14. The system of claim 11, wherein the vehicle data is received from a vehicle electronic control unit via at least one of: a J1939 protocol vehicle data bus, a J1708 protocol vehicle data bus, or an OBDII protocol vehicle data bus.

15. The system of claim 11, wherein the vehicle data is filtered into a desired set of parameters.

16. The system of claim 11, wherein the first memory is either a flash memory or an electrically erasable programmable read-only memory.

17. The system of claim 11, wherein the second memory is either a flash memory or an electrically erasable programmable read-only memory.

18. The system of claim 11, further comprising:
a correlated data transmission module, stored on the first memory, that, when executed by the first processor, causes the first processor to transmit the time-stamped vehicle data to a remote electronic device.

19. The system of claim 11, further comprising:
a correlated data transmission module, stored on the second memory, that, when executed by the second processor, causes the second processor to transmit the time-stamped vehicle data to a remote electronic device.

20. The system of claim 11, further comprising:
a correlated vehicle data generation module, stored on the second memory, that, when executed by the second processor, causes the second processor to generate correlated vehicle data, wherein the correlated vehicle data is representative of an association between the time- stamped vehicle data and the personal data.

21. The system of claim 11, further comprising:
a remote electronic device, comprising;
a third processor and a third memory;
a correlated vehicle data receiving module, stored on the third memory, that, when executed by the third processor, causes the third processor to receive correlated vehicle data for the personal electronic device.

22. The system of claim 11, further comprising:
a remote electronic device, comprising;
a third processor and a third memory;
a correlated vehicle data receiving module, stored on the third memory, that, when executed by the third processor, causes the third processor to receive correlated vehicle data for the vehicle electronic device.

23. A vehicle electronic device, comprising:
an electronic data logging device registration determination module stored on a memory of the vehicle electronic device that, when executed by a processor of the vehicle electronic device, causes the processor to register the vehicle electronic device with a particular user in response to receiving personal data;
a vehicle bus connection, wherein vehicle data is acquired by the vehicle electronic device via the vehicle bus connection when the processor determines that the vehicle electronic device is registered with the particular user; and
at least one of:
a data edit module stored on a memory of the vehicle electronic device that, when executed by a processor of the vehicle electronic device, causes the processor to edit any one of: the personal data or the vehicle data, and to perform at least one of: correct errors, remove personal information, add data, remove data, or reformat data; or
a correlated data reconciliation module stored on a memory of the vehicle electronic device that, when executed by a processor of the vehicle electronic device, causes the processor to reconcile data stored in a memory of the vehicle electronic device with data stored in a memory of a personal electronic device.

24. The vehicle electronic device of claim 23, further comprising:
a personal electronic device connection, wherein the vehicle data is transmitted by the vehicle electronic device via the personal electronic device connection when a personal electronic device is communicatively coupled to the personal electronic device connection.

25. The vehicle electronic device of claim 23, wherein the vehicle data is correlated with a first user when the first user is registered with the vehicle electronic device.

26. The vehicle electronic device of claim 25, further comprising:
a vehicle data storage, wherein the vehicle data is stored in the vehicle data storage when the personal electronic device is not communicatively coupled to the personal electronic device connection.

* * * * *